(12) United States Patent
Wappler et al.

(10) Patent No.: US 12,001,995 B2
(45) Date of Patent: Jun. 4, 2024

(54) SYSTEM AND METHOD FOR PRODUCING AND PROCESSING TRANSPORTATION AND SHIPPING DOCUMENTATION

(71) Applicant: Surgere, LLC, Uniontown, OH (US)

(72) Inventors: William John Wappler, Cuyahoga Falls, OH (US); Robert William Fink, Hudson, OH (US); Charles Edwin Dressler, Wadsworth, OH (US); Michael James Dressler, Wadsworth, OH (US); David Lee Smith, Jr., Ashland, OH (US)

( * ) Notice: Subject to any disclaimer, the term of this patent is extended or adjusted under 35 U.S.C. 154(b) by 184 days.

(21) Appl. No.: 17/689,145

(22) Filed: Mar. 8, 2022

(65) Prior Publication Data

US 2022/0358455 A1 Nov. 10, 2022

Related U.S. Application Data

(63) Continuation-in-part of application No. 17/314,512, filed on May 7, 2021, now Pat. No. 11,880,737.

(51) Int. Cl.
*G06Q 10/0833* (2023.01)
*G06K 7/10* (2006.01)

(52) U.S. Cl.
CPC ..... *G06Q 10/0833* (2013.01); *G06K 7/10227* (2013.01)

(58) Field of Classification Search
CPC .............. G06Q 10/0833; G06K 7/10227
See application file for complete search history.

(56) References Cited

U.S. PATENT DOCUMENTS

| | | | | |
|---|---|---|---|---|
| 5,168,444 A * | 12/1992 | Cukor | .................... | G06Q 40/12 705/330 |
| 6,148,291 A * | 11/2000 | Radican | ............... | G06Q 10/087 705/28 |
| 7,102,509 B1 * | 9/2006 | Anders | .................. | G06Q 10/08 340/870.18 |
| 7,136,832 B2 * | 11/2006 | Li | .......................... | G06Q 10/06 340/505 |
| 7,518,511 B1 * | 4/2009 | Panja | .................. | G06Q 10/087 340/568.1 |
| 7,633,392 B2 * | 12/2009 | Neuwirth | ............. | G06Q 10/087 340/572.1 |
| 7,973,645 B1 * | 7/2011 | Moretti | .............. | G06K 7/10356 340/572.2 |
| 8,065,205 B2 * | 11/2011 | Naghshiineh | .......... | G06Q 10/08 705/29 |
| 9,361,777 B2 * | 6/2016 | Wappler | ............. | G08B 13/2462 |
| 9,400,964 B2 | 7/2016 | Wappler et al. | | |
| 9,760,826 B1 * | 9/2017 | Stine | .................. | G06K 7/10079 |
| 10,217,075 B1 * | 2/2019 | Ward | ................... | G06Q 10/083 |
| 10,891,450 B2 * | 1/2021 | Wappler | ............. | G06K 19/0723 |

(Continued)

*Primary Examiner* — Michael Jared Walker
(74) *Attorney, Agent, or Firm* — Clements Bernard Walker; Richard A. Walker; Jennifer R. Knight

(57) ABSTRACT

Disclosed herein are methods and systems for producing and processing transportation and shipping documents. Embodiments thereof effectively utilize a combination of accurate data collection of vehicle loaded packaging/parts departing a location at, e.g., an exit portal of dock, creation of an electronic BOL populated with that accurate data and other shipping information, which can launch an efficient over the road capability from initial journey to destination with enhanced visibility throughout.

20 Claims, 17 Drawing Sheets

(56) References Cited

U.S. PATENT DOCUMENTS

| | | | |
|---|---|---|---|
| 11,069,440 B2 | 7/2021 | Carter et al. | |
| 11,348,067 B2* | 5/2022 | Schoening | G06K 7/10475 |
| 11,507,918 B2* | 11/2022 | Wappler | G06K 19/0723 |
| 2002/0073114 A1* | 6/2002 | Nicastro | G06Q 10/101 |
| | | | 715/255 |
| 2005/0253704 A1* | 11/2005 | Neuwirth | G06Q 10/087 |
| | | | 340/8.1 |
| 2006/0022800 A1* | 2/2006 | Krishna | G06K 7/0008 |
| | | | 340/10.2 |
| 2006/0022801 A1* | 2/2006 | Husak | G06K 7/0008 |
| | | | 340/10.5 |
| 2006/0022815 A1* | 2/2006 | Fischer | G06K 7/10356 |
| | | | 340/505 |
| 2006/0170565 A1* | 8/2006 | Husak | G06K 17/0029 |
| | | | 340/8.1 |
| 2007/0008184 A1* | 1/2007 | Ho | G08G 1/015 |
| | | | 340/941 |
| 2007/0268138 A1* | 11/2007 | Chung | G06Q 10/08 |
| | | | 340/572.1 |
| 2008/0086320 A1* | 4/2008 | Ballew | G06Q 10/00 |
| | | | 705/342 |
| 2008/0174432 A1* | 7/2008 | Ulrich | G06K 7/0008 |
| | | | 340/572.1 |
| 2008/0270076 A1* | 10/2008 | Breed | B60R 21/01538 |
| | | | 702/185 |
| 2009/0008450 A1* | 1/2009 | Ebert | G06Q 10/08 |
| | | | 235/439 |
| 2009/0024491 A1* | 1/2009 | Choubey | G06Q 10/087 |
| | | | 705/28 |
| 2009/0045924 A1* | 2/2009 | Roberts, Sr. | G08G 1/20 |
| | | | 340/10.41 |
| 2010/0044435 A1* | 2/2010 | Ahlberg | G06K 7/0004 |
| | | | 235/440 |
| 2011/0010275 A1* | 1/2011 | Hull | G06Q 10/087 |
| | | | 705/28 |
| 2012/0268253 A1* | 10/2012 | Tuttle | G06K 7/0008 |
| | | | 340/10.1 |
| 2013/0162459 A1* | 6/2013 | Aharony | G01S 13/04 |
| | | | 342/27 |
| 2013/0257594 A1* | 10/2013 | Collins | G06K 7/01 |
| | | | 340/10.1 |
| 2014/0018059 A1* | 1/2014 | Noonan | H04W 52/283 |
| | | | 455/419 |
| 2014/0074667 A1* | 3/2014 | Smith | G06Q 10/087 |
| | | | 705/28 |
| 2015/0051941 A1* | 2/2015 | Bell | G06Q 10/06315 |
| | | | 705/7.25 |
| 2015/0154525 A1* | 6/2015 | Wappler | G06Q 10/06315 |
| | | | 705/7.25 |
| 2015/0154535 A1* | 6/2015 | Wappler | G06Q 10/087 |
| | | | 705/28 |
| 2015/0381947 A1* | 12/2015 | Renkis | G06V 20/52 |
| | | | 348/159 |
| 2016/0048709 A1* | 2/2016 | Butler | H01Q 9/285 |
| | | | 340/10.51 |
| 2016/0117458 A1* | 4/2016 | Hermans | G16H 10/65 |
| | | | 705/2 |
| 2016/0180123 A1* | 6/2016 | Forster | G06K 7/10019 |
| | | | 340/10.51 |
| 2016/0189093 A1 | 6/2016 | Wappler et al. | |
| 2016/0350706 A1* | 12/2016 | Endries | G06Q 10/08 |
| 2017/0017874 A1* | 1/2017 | Park | G06K 19/07796 |
| 2017/0023377 A1* | 1/2017 | Burtner | G08B 13/2462 |
| 2017/0230790 A1* | 8/2017 | Skomra | G07C 5/008 |
| 2018/0300673 A1* | 10/2018 | Wappler | G01S 13/751 |
| 2019/0026690 A1* | 1/2019 | Wappler | G06Q 50/04 |
| 2019/0311164 A1* | 10/2019 | Teter | G06K 7/10415 |
| 2020/0161742 A1* | 5/2020 | Leitermann | G16H 40/20 |
| 2022/0358301 A1* | 11/2022 | Wappler | G06K 7/10356 |
| 2022/0358455 A1* | 11/2022 | Wappler | G06Q 10/0833 |

* cited by examiner

Door in Use

| Data Element | Value | | Data Element | Value |
|---|---|---|---|---|
| Lane Assignment | LAN000012345 | | Lane Assignment | LAN000012345 |
| Created Date | 3/30/2021 9:23:00 | | Created Date | 3/30/2021 9:23:00 |
| Pick List ID | 678901234 | | Pick List ID | 678901234 |
| Door | Dock 25 | | Door | Dock 25 |
| Origin | OEM Production Facility | | Origin | OEM Production Facility |
| Destination | Supplier Facility | | Destination | Supplier Facility |
| Carrier | ABC Transportation | | Carrier | ABC Transportation |
| Trailer | ABC-123 | | Trailer | ABC-123 |
| Asset Type | Plastic-24X24X24 | | Asset Type | Plastic-24X24X24 |
| Activity ID | Active | | ID | Active |
| Environmental ID | 1102 | | ID | Metal Halo Present |
| Configuration ID | 2301 | | ID | PSR0003 |
| Power | 18.25 | | Power | 18.25 |
| Sensitivity | -60 | | Sensitivity | -60 |
| Reader Mode | M=8 | | Reader Mode | M=8 |

FIG - 9

| Data Element | Value | Data Element | Value |
| --- | --- | --- | --- |
| Lane Assignment | NULL | Lane Assignment | NULL |
| Created Date | NULL | Created Date | NULL |
| Pick List ID | NULL | Pick List ID | NULL |
| Door | NULL | Door | NULL |
| Origin | NULL | Origin | NULL |
| Destination | NULL | Destination | NULL |
| Carrier | NULL | Carrier | NULL |
| Trailer | NULL | Trailer | NULL |
| Asset Type | NULL | Asset Type | NULL |
| Activity ID | Not Active | ID | Not Active |
| Environmental ID | Dock 25 | ID | Standard |
| Configuration ID | 1000 | ID | 1000 |
| Power | 0 | Power | 0 |
| Sensitivity | 0 | Sensitivity | 0 |
| Reader Mode | M=8 | Reader Mode | M=8 |

Door NOT in Use

FIG. - 10

Enter Phone number for Manifest link to be sent via text message:

### ####

Submit

I do not Consent

If you do not consent you must keep your browser open, if you close your browser, you may lose access to your Paperwork.
Standard messaging rates apply.
Your phone number will not be shared or stored upon final delivery Terms and Conditions

SYSTEM AND METHOD FOR PRODUCING AND PROCESSING TRANSPORTATION AND SHIPPING DOCUMENTATION

CROSS-REFERENCE TO RELATED APPLICATION

The present patent application/patent claims the benefit of priority of co-pending U.S. patent application Ser. No. 17/314,512, filed on May 7, 2021, and entitled "DYNAMIC RFID PORTAL MODULATION, the contents of which are incorporated in full by reference herein.

FIELD OF THE DISCLOSURE

The present disclosure relates generally to systems and methods for producing and processing transportation and shipping documentation. More specifically, the present disclosure relates to the use of an electronic bill of lading (BOL) and associated shipping documents in such environments.

BACKGROUND OF THE DISCLOSURE

A bill of lading (BOL) is a document typically issued by a carrier, or a manufacturer to a carrier, to acknowledge receipt of cargo for shipment. BOLs are typically legal documents required to be produced and provided to the carrier regarding the contents of their trailer, and are also used for chain of custody purposes.

Often, each trailer shipment has its own paper BOL document or form and, over a day's worth of travel, a driver may often collect numerous such documents. This paperwork is typically submitted by the driver at the completion of a shipment for processing by billing clerks via data entry systems.

Inefficiencies due to awaiting arrival of the driver's BOL paperwork, numerous separate paperwork for each shipment, as well as potential errors due to manual data entry, and so forth, are just some of the potential problems encountered by current systems and methods.

U.S. Pat. No. 5,168,444 discloses a system employing the faxing of BOLs from local shipping terminals to company headquarters. U.S. Pat. No. 8,065,205 discloses a system for transmitting BOLs to a central facility employing electronic BOLs.

Despite potential advancements such as the foregoing, there exists a further need for systems and methods for producing and processing transportation and shipping documentation, and especially employing an electronic bill of lading (BOL) in such environments which increase efficiency and accuracy.

Embodiments of the present disclosure address the foregoing need and others.

BRIEF SUMMARY OF THE DISCLOSURE

Electronic BOLs can be effectively used in the transportation, especially trucking, industry as a way to reduce paper and ease the distribution of required documentation.

Embodiments of the present disclosure offer advantages and differentiating factors, as well as solve problems currently encountered in the industry. For instance, advantages of embodiments of the disclosure include:

1. The way in which details such as trailer contents of the BOL are populated is advantageous in that the data is not hand keyed or sent from an internal application. The contents of the BOL may be collected autonomously via an Internet of Things (IoT) sensor device such as RFID, as material is loaded onto a trailer;
2. The BOL and other associated shipping documentation/paperwork (herein may be referred to as BOL plus) may be created and made available from the same software application that the IoT device transactions are distributed to. This is seen as unique in the sense that the BOL and other associated documentation/paperwork have not previously utilized autonomously recorded data using IoT sensors that identify contents and associate assets or material to a trailer;
3. An electronic version of the BOL and other associated documentation/paperwork may be available for provision to a carrier for acceptance. The acceptance of the electronic documents can prompt the user to allow for tracking via a GPS and cellular enabled device while the load is in transit. This tracking may initiate at acceptance and terminate at the point at which the device enters a geofence within a designated proximity of the destination. The electronic documents may be made available for receipt and use on a mobile device;
4. The acceptance and termination events may serve as a transfer of custody between parties;
5. The BOL and other associated documentation/paperwork may be transferred to a designee of the trailer contents by IoT sensors or via bar codes; and
6. The same platform utilized for electronic BOL and other associated documentation/paperwork production may be constructed to accept trailer localization information from carriers that leverage other on-board GPS functional devices that lack ability to electronically transfer documentation, by use of a common API platform.

Accordingly, embodiments of the disclosure solve numerous problems and create over the road visibility for tractor trailers in a highly scalable fashion. Some problems that may be solved advantageously include elimination of hard copies or actual paperwork of the BOL plus; more accurate BOL's using IoT sensor acquisition to populate the BOL plus details, such as material, quantity, etc.; traceability and recovery of BOL plus details, wherein lost paperwork no longer becomes an issue; historical access to all BOL's; and a common platform to accept localization from an existing GPS platform by a carrier, providing visibility to all trailers in one platform.

Moreover, embodiments can leverage a mobile device to provide tracking/localization and thus introduce a scalable efficient and economical way to obtain over the road localization in real-time. It is noted that the industry has struggled to find a way to install or provide the needed infrastructure to equip trailers and/or drivers to provide accurate and current real time location data. By using a mobile device and connecting contents to a trailer, trailer to driver visibility may be enabled with, e.g., the company/driver's acceptance of a BOL and acceptance of any privacy terms.

Embodiments effectively utilize a combination of accurate data collection of vehicle loaded packaging/parts departing a location at, e.g., an exit portal of dock, creation of an electronic BOL populated with that accurate data and other shipping information, which can launch an efficient over the road capability from initial journey to destination with enhanced visibility throughout.

Thus, according to an embodiment, a method of processing transportation documentation using an electronic bill of lading comprises identifying in a structure a plurality of different assets to be loaded; wherein each asset of the plurality of different assets is of a known identification and includes a RFID tag, and all RFID tags of the plurality of different assets are not the same. The method also comprises identifying a selected structural opening of a plurality of structural openings to be utilized with loading of the plurality of different assets onto a vehicle, wherein each structural opening of the plurality of structural openings is equipped with an RFID portal including a reader antenna, and each RFID portal includes at least power, sensitivity, mode and off settings; and individually, tuning the power, sensitivity and mode settings of the RFID portal of the selected structural opening based on the known identification of the plurality of assets and RFID tags utilized in the selected structural opening such that the reader of the RFID portal of the selected structural opening reads the RFID tag of the plurality of different assets, and obtain asset details including asset serial number thereby reading and identifying the assets loaded onto the vehicle. The method further comprises populating the electronic bill of lading with the obtained asset details of the assets loaded onto the vehicle using the portal of the selected structural opening; and tracking the assets loaded onto the vehicle in route to a destination with use of a driver's device, wherein the populated electronic bill of lading is transferred to the driver's device.

According to another embodiment, a system for processing transportation documentation using an electronic bill of lading comprises a plurality of different assets configured to be loaded; wherein each asset of the plurality of different assets is of a known identification and includes a RFID tag, and all RFID tags of the plurality of different assets are not the same; and a plurality of RFID portals. The system is configured to identify a selected structural opening of a plurality of structural openings to be utilized with loading of the plurality of different assets onto a vehicle, wherein each structural opening of the plurality of structural openings is equipped with an RFID portal including a reader, and each RFID portal includes at least power, sensitivity, mode and off settings. The system is also configured to individually tune the power, sensitivity and mode settings of the RFID portal of the selected structural opening based on the known identification of the plurality of assets and RFID tags utilized in the selected structural opening such that the reader of the RFID portal of the selected structural opening reads the RFID tag of the plurality of different assets, and obtain asset details including asset serial number thereby reading and identifying the assets loaded onto the vehicle. The system is further configured to populate the electronic bill of lading with the obtained asset details of the assets loaded onto the vehicle using the portal of the selected structural opening; and to track the assets loaded onto the vehicle in route to a destination with use of a driver's device, wherein the populated electronic bill of lading is transferred to the driver's device.

BRIEF DESCRIPTION OF THE DRAWINGS

The presently disclosed systems and methods illustrated and described herein with reference to the drawings, in which:

FIG. 9 is a diagram illustrating an example table displaying information including door or portal status (in use) for display on a device configured to be in communication with herein described systems, according to embodiments.

FIG. 10 is a diagram illustrating an example table displaying information including door or portal status (not in use) for display on a device configured to be in communication with herein described systems, according to embodiments.

FIG. 15 is a diagram of a phone number input screen employed in embodiments.

DETAILED DESCRIPTION OF THE DISCLOSURE

Again, electronic BOLs can be effectively used in the transportation, especially trucking, industry as a way to reduce paper and ease the distribution of required documentation.

Embodiments of the disclosure solve numerous problems and create over the road visibility for tractor trailers in a highly scalable fashion. Some problems that may be solved advantageously include elimination of hard copies or actual paperwork; more accurate BOL's using IoT sensor acquisition to populate the BOL plus details, such as material, quantity, etc.; traceability and recovery of BOL plus details, wherein lost paperwork no longer becomes an issue; historical access to all BOL's; and a common platform to accept localization from an existing GPS platform by a carrier and providing visibility to all trailers in one platform.

As further explained below, embodiments of the disclosure advantageously provide a method and system of using an electronic BOL employing IoT sensors or RFID portals as assets are loaded onto a truck or trailer with the particular identification of those assets. Embodiments thus populate the electronic BOL using an IoT sensor or RFID portal positioned at the dock. For instance, as further explained below according to embodiments, an RFID tag may be located on each asset to be loaded, and when the asset is loaded onto the truck or trailer, it is read at the portal and assigns the asset to the particular truck or trailer. Other types of readers, such as Bluetooth beacons or readers could also be employed. For instance, each asset to be loaded may have a Bluetooth tag therein and a Bluetooth beacon may be located on the trailer such that as the assets are loaded, the beacon would associate that asset with a Bluetooth tag thereon to the beacon, essentially functioning similarly to the RFID reader. Pending parent U.S. patent application Ser. No. 17/314,512, the entire contents of which are hereby incorporated by reference, by the subject Assignee describes examples of tag types, readers, IoT sensors, methods/systems and so forth that may be also employed herein. Advantageously, the method and systems described may be effectively employed in embodiments to, e.g., accurately capture the asset data/data collection of packaging parts departing the location.

Delivery Area and IoT Sensing

Figure 1:
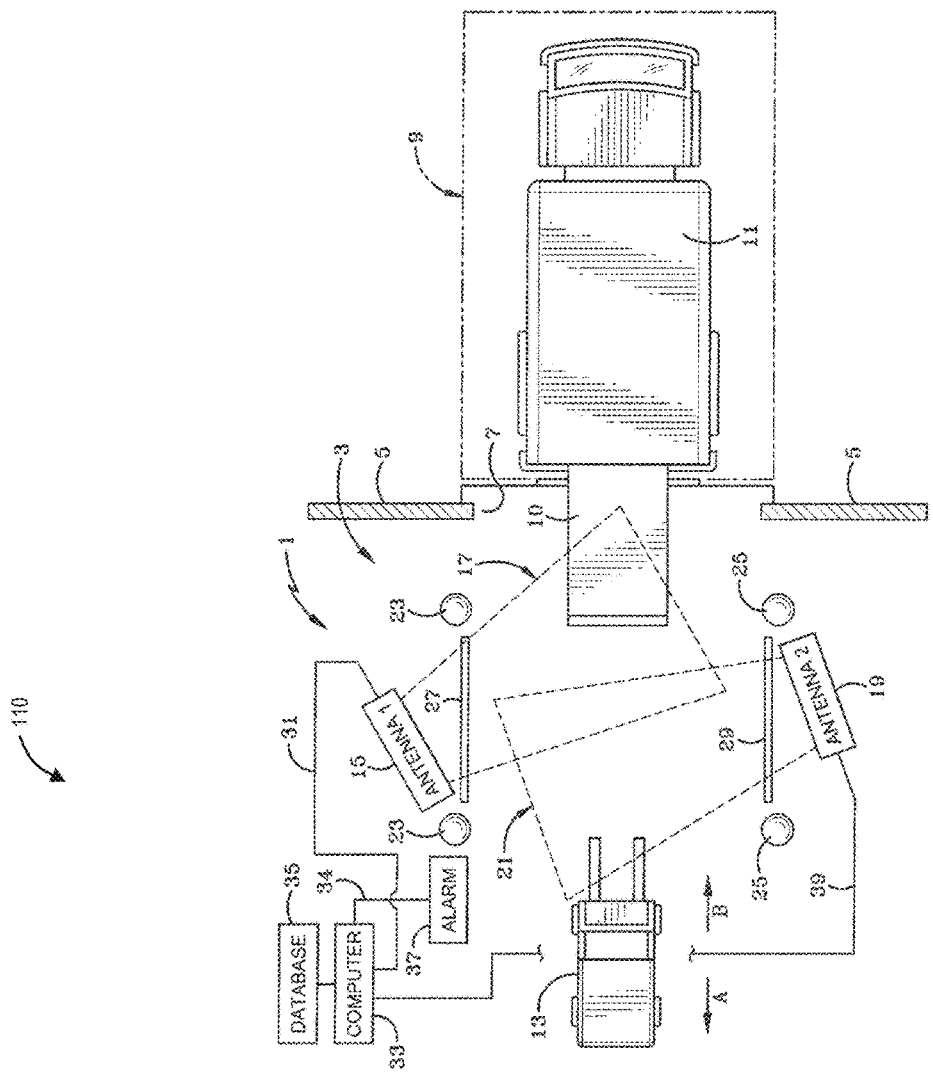
FIG. 1 is a diagram illustrating a top view of a delivery area of a structure including a gate system.

Accordingly, referring now to FIG. 1, depicted therein is a RFID portal system 1. The reader will readily understand that the fundamentals of electromagnetic wave propagation, antenna design, and signal processing are well within the prior art and readily understood by one familiar therewith and thus are not herein described in detail.

System 1 is configured to work in conjunction with a building or structure 3 which includes a wall 5 defining an opening 7. Opening 7 is typically embodied in an entranceway into structure 3 at a loading dock area 9, and may be selectively sealable with a door (not shown). In the loading dock area 9, a truck 11 may be positioned proximate opening or dock door 7 with a platform 10 extended therefrom and through opening 7 for transferring items between truck 11 and structure 3. A forklift 13 is provided in FIG. 1 for reference and may be used to aid in transferring items between truck 11 and structure 3.

As shown in FIG. 1, set forth is an example where a first antenna 15 is disposed within structure 3. First antenna 15 is a directional antenna having a first radiation pattern 17 emanating therefrom in a particular direction. As shown in FIG. 1, first antenna 15 may be angled such that first radiation pattern 17 is angled generally towards opening 7. An item emanating a signal in the proper frequency will be received by first antenna 15 when the item is within first radiation pattern 17. Conversely, inasmuch as first antenna 15 is a directional antenna, the signal will not be received by the first antenna 15 when the item is outside of first radiation pattern 17. A second antenna 19 is also disposed within structure 3. Second antenna 19 is a directional antenna having a second radiation pattern 21 emanating therefrom in a particular direction. As shown in FIG. 1, second antenna 19 may be angled such that second radiation pattern 21 is angled generally away from opening 7. Similar to first antenna 15, any properly formatted signal emanating from an item within second radiation pattern 21 will be received by second antenna 19, as second antenna 19 is a directional antenna. Also, similar to first antenna 15, second antenna 19 will not receive signals emanating from outside second radiation pattern 21.

First antenna 15 is positioned behind a first set of bumpers 23 while second antenna 19 is positioned behind a second set of bumpers 25. First set of bumpers 23 provide protection for first antenna 15 while second set of bumpers 25 provide protection for second antenna 19 and both sets of bumpers 23 and 25 are made from sturdy material, such as steel or reinforced aluminum. Bumpers 23 and 25 are provided to protect antennas 15 and 19, respectively, as warehouses and stockroom areas are often busy with forklifts 13 and other various equipment such as dollies moving thereabout. First antenna 15 is further positioned behind first shield 27 while second antenna 19 is further positioned behind second shield 29. While first set of bumpers 23 and second set of bumper 25 are preferably metallic, first shield 27 and second shield 29 are preferably made from plastic or another similar material which efficiently facilitates the passing through of electromagnetic signals. First shield 27 and second shield 29 are formed from non-metallic material to allow first antenna 15 and second antenna 19 to send and receive signal therethrough.

As further shown in FIG. 1, first antenna 15 is connected to a computer 33 by way of a first connection 31. First connection 31 may be a wired or wireless connection for providing a communications mechanism between first antenna 15 and computer 33. Computer 33 may be any style of computing device, and may include a processor (not shown) coupled with a memory (not shown). Computer 33 is also connected to an alarm 37 by way of an alarm connection 34. Alarm connection 34 may be a wired or wireless communication mechanism and provides for data communication between computer 33 and alarm 37. Alarm 37 may be any style of alarming type of system which includes an audible alarm, a silent alarm, or any other type of alert system, including alerting a particular personnel of building 3. Similar to first antenna 15, second antenna 19 is connected to computer 33 by way a second connection 39. Second connection 39 may be a wired or wireless connection and provides a mechanism for transferring data between computer 33 and second antenna 19. First antenna 15 and second antenna 19 provide information and data relating to signals received thereby and transfers this data to computer 33 by way of first connection 31 and second connection 39, respectively.

As an item emanating a signal passes between first antenna 15 and second antenna 19, first antenna 15 and second antenna 19 receive the signal along with its varying signal strength as it passes through first radiation pattern 17 and second radiation pattern 21, respectively. This information is transferred to computer 33 by way of first connection 31 and second connection 39, wherein computer 33 processes the information. Database 35 accordingly stores data provided to computer 33.

Figure 2:
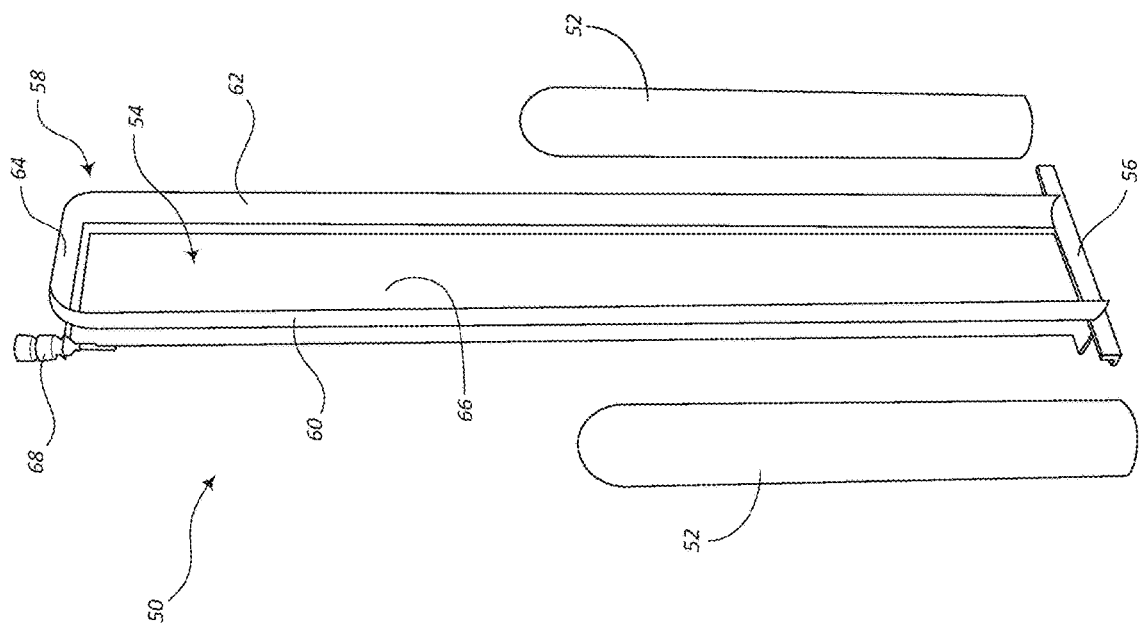
FIG. 2 is a diagram illustrating a perspective view of an RFID reader antenna and shroud assembly.

Gate system 1 is preferably implemented using radio frequency identification (RFID) technology, which a non-line of sight technology. In particular, a directional RFID system as disclosed in Applicant's U.S. Pat. No. 10,891,450 may be employed; other RFID systems may be employed, as well. For example, as shown in FIG. 2, an antenna assembly 50 may be employed for each of the afore-described first antenna 15 and second antenna 19 and instead thereof. Antenna assembly 50 may be installed at a temporary or permanent location. It may be desired to install one or more bollards 52 or other safety bumpers or posts to protect the stationary antenna assembly 50 from accidental contact with forklifts, pallet trucks, scooters, or other moving objects.

The antenna assembly 50 includes an antenna 54, or reader antenna. The antenna 54 may be a planar antenna or sector antenna for creating a radiation pattern within a sector (e.g., fanned-shaped pattern of 60 degree, 90 degree, 120 degree, or other suitable angle, about a horizontal axis). The antenna 54 may be supported in a permanent arrangement on a floor (e.g., the floor of a warehouse) by a base 56. Surrounding the outer edges of the antenna 54 is a shroud assembly 58. As illustrated, the shroud assembly 58 may include a left shroud element 60, a right shroud element 62, and a top shroud element 64. The shroud assembly 58 may further include a bottom shroud element (not shown), which may be positioned near the base 56.

The left shroud element 60 is configured to reduce the EM radiation pattern of the antenna 54, and, in particular, may reduce the EM backscatter radiation that can be sensed at a left side of a fanned-out pattern extending from a front face 66 of the antenna 54. Similarly, the right shroud element 62 is configured to reduce the EM radiation pattern of the antenna 54, and, in particular, may reduce the EM backscatter radiation that can be sensed at a right side of the fanned-out pattern extending from the front face 66 of the antenna 54. The shroud assembly 58 may include just the left and right shroud elements 60, 62 for limiting the reading zone in only a lateral direction. However, the shroud assembly 58 may further include the top shroud element 64, which may be configured to reduce the EM radiation pattern in a vertical direction. Specifically, the top shroud element 64 may limit the height of the EM backscatter radiation sensing pattern to prevent communication with RFID tags 14, 18 shown in FIG. 4 on a level (e.g., an upper floor) where interrogation is not wanted.

Figure 4:
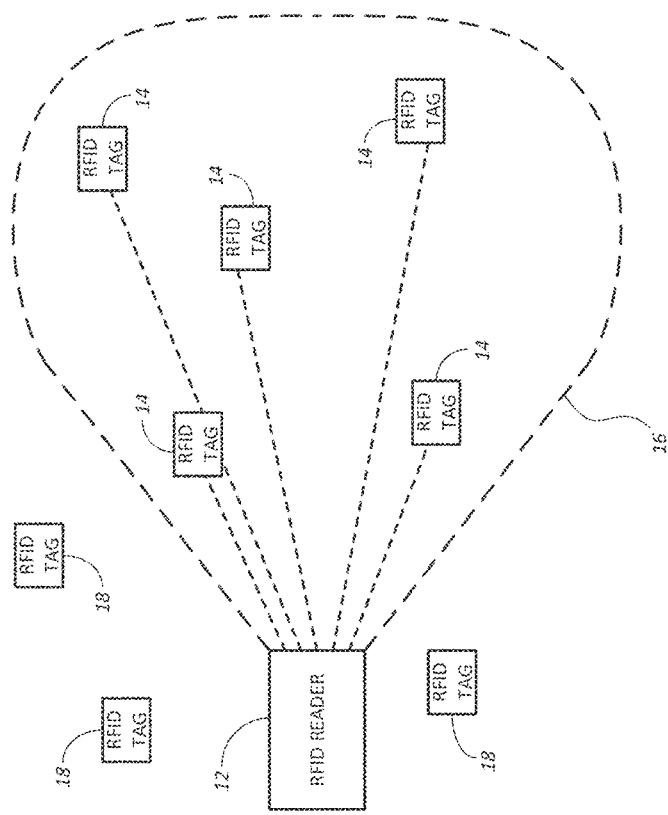
FIG. 4 is a diagram illustrating a system for tracking an identifying items in which the RFID reader antenna and shroud assembly of FIG. 2 may be employed.

With further reference to FIG. 4, the antenna assembly 50 may be part of an RFID reader apparatus (e.g., see RFID reader 12) and may operate with other elements of the RFID reader apparatus to send interrogation signals to RFID tags within a sensing zone (e.g., sensing zone 16) and then receive ID information from one or more RFID tags. The RFID reader apparatus may further include, in addition to the antenna 54 and shroud assembly 58, an indicator 68. The indicator 68 may include one or more lights, an audio output device, and/or other indication elements. In use, the RFID reader may cause the indicator 68 to provide an indication to nearby personnel when the RFID reader is actively in the process of reading RFID tags. The indicator 68 can also indicate when an error has occurred in the reading process and/or that the items need to be read again and may be configured to indicate other activities and/or conditions of the RFID reader.

Thus, the shroud assembly 58 may be configured to control or restrict the reach and/or breadth of the EM waves transmitted by the antenna 54 and the EM backscatter energy received by the antenna 54. The shroud assembly 58 may be specifically designed to constrain the RFID read zone and to eliminate cross reads or stray reads from RFID tags 18 outside the RFID read zone. Therefore, the shroud assembly 58 may be configured to ensure that only the RFID tags 14 within the specific read zone are read and to minimize unwanted RFID tag reads from RFID tags 18 outside the sensing zone 16.

Figure 3:
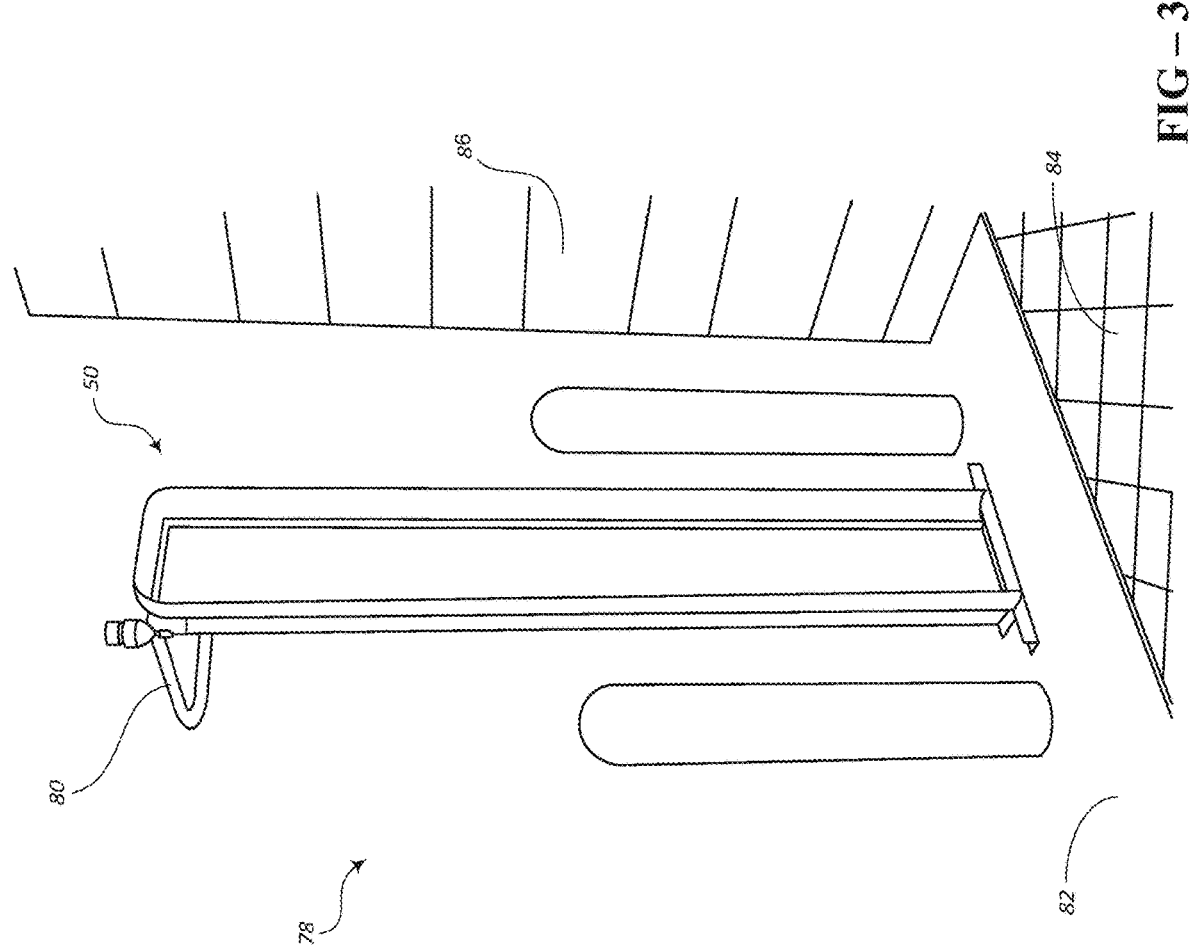
FIG. 3 is a diagram illustrating a perspective view of the RFID reader antenna and shroud assembly of FIG. 2 being used in a warehouse environment.

FIG. 3 shows a perspective view of the antenna assembly 50 of FIG. 2 installed in a warehouse environment 78. As shown, the antenna assembly 50 is connected to cables 80 or other electrical conductors for connection with an RFID reader (not shown) and/or power source (not shown). The antenna assembly 50 is installed on a warehouse floor 82 within the warehouse environment 78 and may be positioned with a radiation/sensing pattern that extends out over an area on the warehouse floor 82 which may include an industrial scale 84 or other feature that may be used during a process of shipping or receiving bulk items.

In this environment, a plurality of items may each have an RFID tag and may be brought to a bay 86 in the warehouse environment 78 for loading onto a truck for shipment to a retail store or other location. While the items may be placed on the scale 84 to be weighed, the RFID reader may be configured to transmit interrogations signals within a sensing zone generally corresponding to the space above the scale 84. By restricting the sensing zone created by the antenna 54 and shroud assembly 58, the antenna assembly 50 is thereby configured to exclude other outlying spaces outside the specific electromagnetic radiation pattern.

The multiple RFID tags within the sensing zone can respond with their ID information, which can be recorded by the RFID reader. An inventory system may include the RFID reading apparatus for identifying items in the sensing zone and may further include the industrial scale 84 for recording the shipping weight of these items. According to various implementations, the sensing zone may be used for recording item information when items are received (imported) at the warehouse environment 78 and/or when items are to be shipped (exported) from the warehouse environment 78. Still other implementations may include other passageways, intersections, thoroughfares, etc., within or associated with the warehouse environment 78 through which the items may pass on their way to another area (e.g., other areas within the same warehouse, from one room to another, etc.). Thus, the antenna assembly 50 may be placed, either permanently or temporarily, at any strategic location (e.g., in front of the bay 86, near a scale 84, or at other locations) where the items can be tracked.

Figure 5:
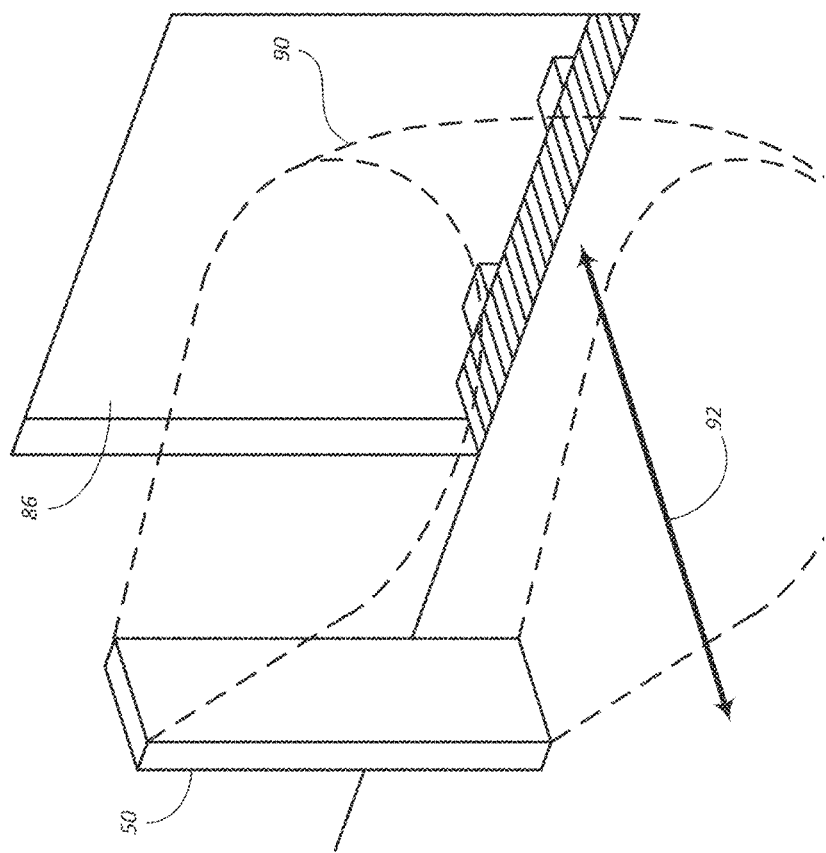
FIG. 5 is a diagram illustrating a perspective view of a limited backscatter sensing zone of the system of FIG. 4.
Figure 6:
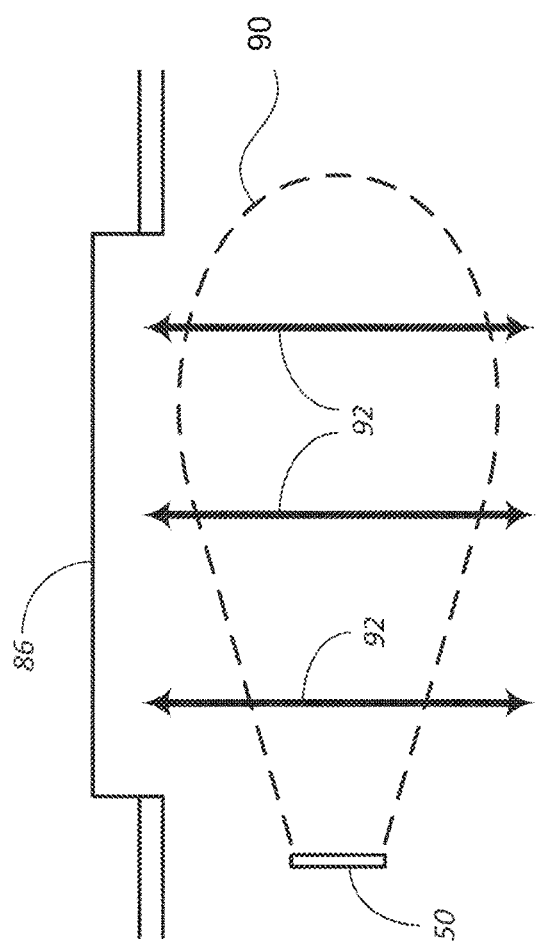
FIG. 6 is a diagram illustrating the top view of the limited backscatter sensing zone of the system of FIG. 4.

FIG. 5 is a perspective view of a three-dimensional reading zone 90 of the assembly 50 shown in FIG. 4, which may include a reduced space based on the effects of the shroud assembly 58. FIG. 6 shows the reading zone 90 from a top view. As shown in FIGS. 4 and 5, the three-dimensional reading zone 90 (backscatter sensing zone) has a fan-shaped radiation pattern that extends orthogonally from the assembly 50. A path of travel 92 for route of items is also illustrated therein. The shroud assembly reduces the sides (width) of the zone 90, but does not block the zone 90 in the orthogonal direction, which may create an open-faced type of pattern.

It is noted that while examples of suitable antenna systems and configurations are shown in FIGS. 1-6, it will be appreciated that other antenna systems and configurations could be employed.

Figure 7:
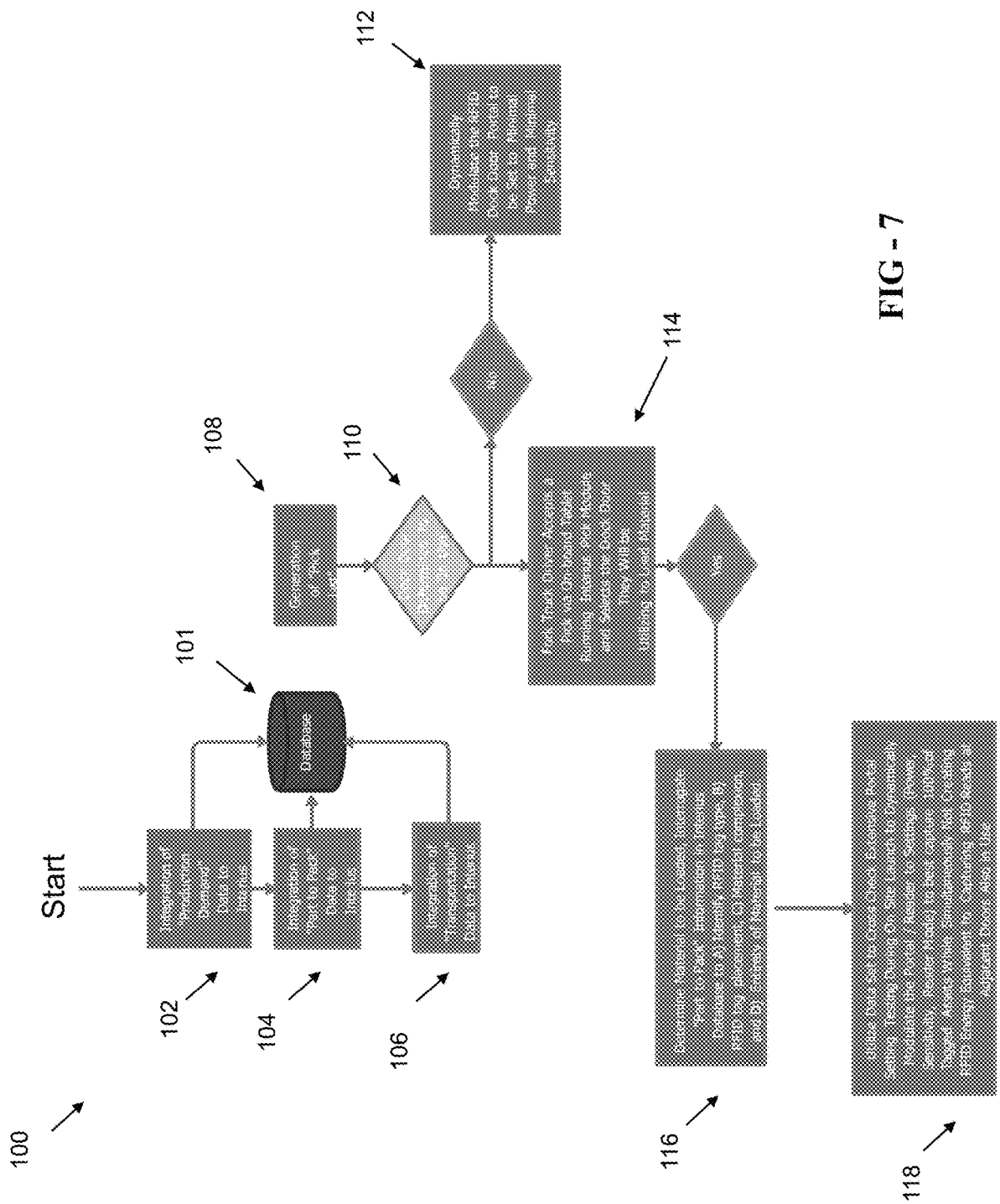
FIG. 7 is a block diagram of a flowchart illustrating a method/system of dynamic modulation.

Referring now to FIG. 7, set forth therein is a block flow diagram illustrating an example method/system 100, according to embodiments of the invention to further demonstrate the advantageous application of the dynamic modulation in a manufacturing environment. As shown therein, method 100 comprises at step 102 an integration of product demand data to an Internet of Things (IoT) platform (INTERIUS/COS Database 101) which provides data analytics and is a proprietary cloud based software which can use RFID sensors to gather activity data, which is then used to track assets, such as reusable automotive containers and other parts, through each link in a supply chain. Product demand data may include details regarding production plans for volume of finished goods and/or vehicle production, and the parts required from the supply base needed to meet the production plan. Step 104 shown in FIG. 7 comprises the integration of part to pack data to the IoT Platform (INTERIUS/COS Database 101). The part to pack data may include, e.g., a) the container, rack or corrugate box each part ships in; b) pack and/or part specifications including size/dimensions, material type such as plastic, steel, etc., weight, packs per pallet, and whether the material is stackable; and c) what RFID brand, model, chipset is utilized on the pack or asset and location on the asset where the tag is placed. Step 106 comprises the integration of transportation data to the IoT platform (INTERIUS/COS Database 101). The transportation data may comprise, e.g., details regarding what carriers have been scheduled to pick up material at the manufacturing facility, how many trailers will be arriving, the time the trailers will be arriving, and identification of the predetermination destination for the carrier. Step 108 of FIG. 7 illustrates a generation of pick list. More particularly, an INTERIUS/COS Database 101 generated pick list may utilize, e.g., production demand, real time inventory at the manufacturer and supply base, and scheduled transportation to determine what assets/containers need to be loaded on outbound trailers, as well as the quantity of the same. In Step 110, it is determined whether a dock door is in use. If the dock door is not in use or scheduled to be in use, and as illustrated in Step 112, the RFID dock door portal may be dynamically modulated to be tuned downed and thus set to minimal power and minimal sensitivity setting, or possibly to an off position to conserve energy resources. As shown in Step 114, if the dock door is in use or scheduled to be in use, e.g., a fork truck driver accepts a pick via on-board tablet running the IoT Platform (INTERIUS/COS Database 101) and selects the dock door they will be utilizing to load the material/assets. Step 116 then comprises determining the material/assets to be loaded, interrogate part to pack information in the INTERIUS/COS Database 101 to, e.g., a) identify RFID tag type; b) RFID tag placement; c) material complexion; and d) entirety of material to be loaded. At Step 118, the data set may be utilized to cross check extensive portal setting testing during on site launch to dynamically modulate the portal/reader to settings (e.g., power, sensitivity, reader mode) to best capture about 100% of tagged assets while simultaneously not creating RFID energy equivalent to capturing RFID reads at adjacent doors that also may be in use.

Figure 8:
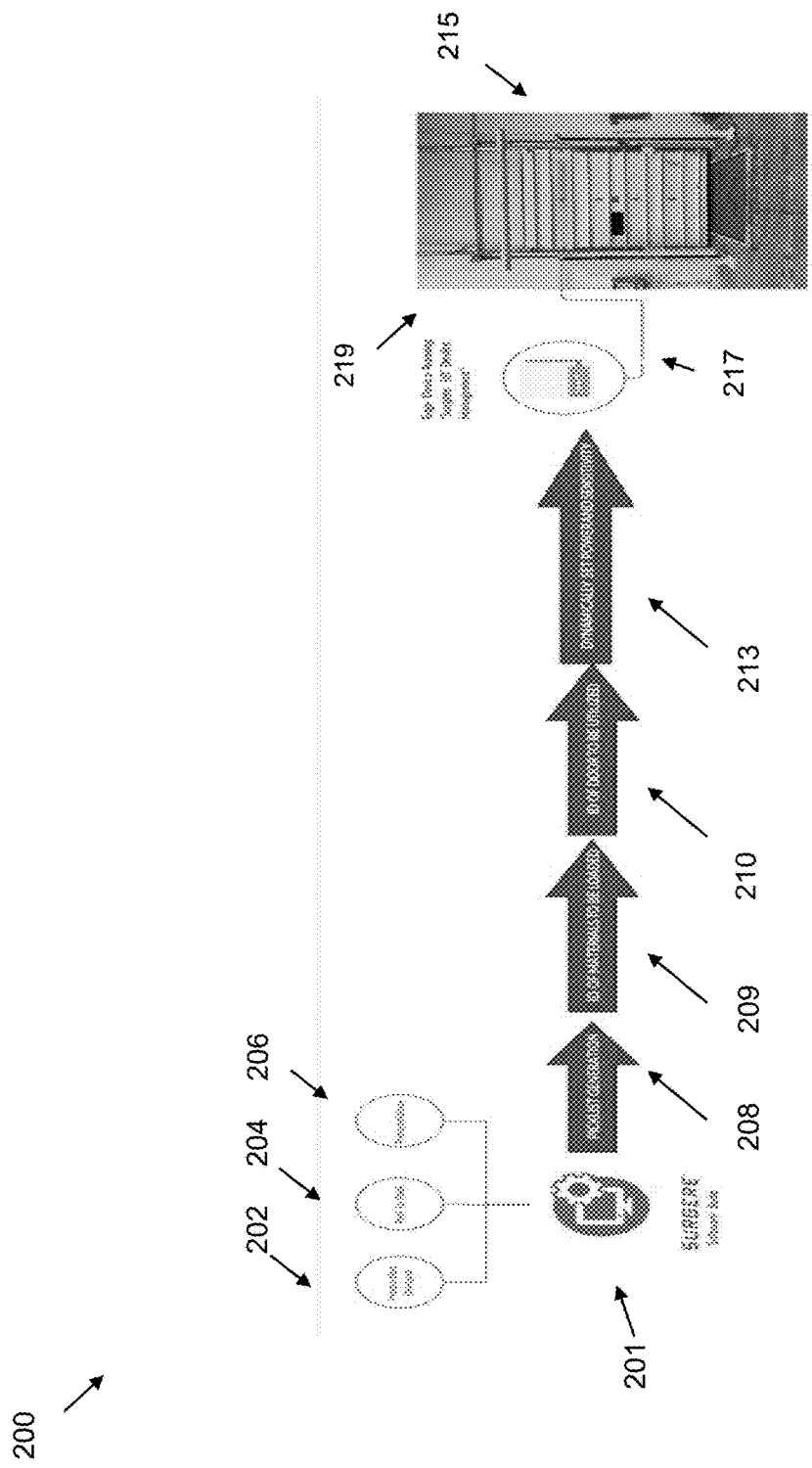
FIG. 8 is a diagram illustrating a modified flowchart of FIG. 7 illustrating a method/system of dynamic modulation and showing an edge device, according to embodiments.

Referring now to FIG. 8, set forth therein is a diagram illustrating an example method/system 200 as a modified flowchart of FIG. 7 including edge device 217, according to embodiments of the invention. As shown therein, method/system 200 comprises at 202 an integration of product demand data to an Internet of Things (IoT) platform (INTERIUS/COS Database/Software Suite 201) which provides data analytics and is a proprietary cloud based software which can use RFID sensors to gather activity data, which is then used to track assets, such as reusable automotive containers and other parts, through each link in a supply chain. Product demand data may include details regarding production plans for volume of finished goods and/or vehicle production, and the parts required from the supply based needed to meet the production plan. FIG. 8 further shows at 204 integration of part to pack data to the IoT Platform (INTERIUS/COS Database/Software Suite 201). The part to pack data may include, e.g., a) the container, rack or corrugate box each part ships in; b) pack and/or part specifications including size/dimensions, material type such as plastic, steel, etc., weight, packs per pallet, and whether the material is stackable; and c) what RFID brand, model, chipset is utilized on the pack or asset and location on the asset where the tag is placed. FIG. 8 also shows at 206 integration of transportation data to the IoT platform (INTERIUS/COS Database/Software Suite 201). The transportation data may comprise, e.g., details regarding what carriers have been scheduled to pick up material at the manufacturing facility, how many trailers will be arriving, the time the trailers will be arriving, and identification of the predetermination destination for the carrier. At 208, an INTERIUS/COS Database/Software Suite 201 generated pick list may utilize, e.g., production demand, real time inventory at the manufacturer and supply base, and scheduled transportation to determine what assets/containers need to be loaded on outbound trailers, as well as the quantity of the same; see 209 identification of materials. At 210, it is determined whether a dock door is in use (e.g., identification of door to be utilized). If the dock door is not in use or scheduled to be in use, the RFID dock door portal may be dynamically modulated to be tuned downed and thus set to minimal power and minimal sensitivity setting, or possibly to an off position to conserve energy resources. If it is determined that the dock door (see, e.g., 215) is in use or scheduled to be in use, e.g., a fork truck driver accepts a pick via on-board tablet running the IoT Platform (INTERIUS/COS Database/Software Suite 201) and selects the dock door they will be utilizing to load the material/assets, followed by determining the material/assets to be loaded, interrogate part to pack information in the INTERIUS/COS Database/Software Suite 201 to, e.g., a) identify RFID tag type; b) RFID tag placement; c) material complexion; and d) entirety of material to be loaded. The data set may be utilized to cross check extensive portal setting testing during on site launch to dynamically modulate at 213 the portal/reader to settings (e.g., power, sensitivity, reader mode) to best capture about 100% of tagged assets while simultaneously not creating RFID energy equivalent to capturing RFID reads at adjacent doors that also may be in use.

It is further noted that the INTERIUS/COS Database/Software Suite 201 comprises software that performs processing and it is a cloud based solution. Edge device 217 conducts processing taking place at, e.g., the sensors located at dock door 215 and includes, e.g., the antenna(s), computer/processor for the edge computing. Advantageously, there may be multiple or many edge devices 217 for distributed processing. Edge device(s) 217 may be utilized to conduct initial pre-processing of data via algorithms with desired embedded code. According to embodiments, there is advantageously the ability to individually and remotely control the edge device(s) 217 regarding, e.g., mode, modulation, and power settings. Thus, proprietary code may be embedded in the computer of the edge device(s) 217 and common communication protocols may be used to access and run the communication. For example, the edge device(s) 217 or portal/reader (computer) can receive signals from the antenna(s) and processes the antenna data that reads the tags (unique serial number). The portal/reader can be dynamically configured to optimize the ability to read all of the tag types, and thus also avoid missed reads.

Set forth below are further details regarding dynamically tuning the portal, according to embodiments. The dynamic tuning may begin with an understanding of whether, e.g., the dock door (location of the portal) is in use or not. This may be identified through the presence of what is referred to as a lane assignment. Lane assignments can be manually created in the Surgere application, or managed through an interface with the customer's transportation system, from which an understanding of scheduled shipments/departures along with time may be provided. Once a lane assignment has been created, the details from a content or type of material to be loaded perspective may be identified, as referenced by information provided through a customer lane assignment interface. Embodiments of the herein systems may instruct users on what to load on outbound trailers. The details from an asset or content standpoint may include: Asset material (plastic/metal), Asset size, Quantity of asset per pallet, Tag location, Tag type, Tag model, and Tag chip type. Each dock door can be assigned an environmental ID in the Surgere application. This environmental ID may be a 4 digit code, that can reference the different possible combinations of environmental factors that could influence or impact RFID data capture such as, but not limited to: A metal charging station being present adjacent to the door, Material being staged near the door, Metallic shavings in the concrete floor, Lack of a dock plate at the door, Unusually close adjacent doors, Adjacent metal racks, Temperature, Humidity, and Activity at adjacent door, and so forth.

At the initiation of each lane assignment, the door may be marked as active. The system can evaluate the type of material to be loaded in combination with the environmental ID to associate a correct configuration ID to obtain optimal acquisition. The configuration ID can be a unique 4 digit value that represents the unique combinations of reader power, sensitivity, and reader mode programmable at the reader level. The management and assignment of configuration ID's may be determined at the application layer, and managed at the device or edge level. The process may repeat for each established lane assignment in the application, according to embodiments.

Additionally, for portals that are not active, the portal power may be reduced or eliminated so that spurious signals are not received by the active portal; thereby increasing its read rate accuracy.

The system can also identify instances whereby adjacent portals are both in active mode, which can influence the environmental ID associated for these portals.

As a non-limiting example, in view of pre-knowledge based on shipping information, etc., if it is known that A and B tag types, but not C and D tag types, are going to be present, the portal/reader may be dynamically tuned to optimize performance for A and B tag types. This tuning may be a dynamic change and may occur in real time and within minutes or seconds of receiving the knowledge of the particular tag types. As a further non-limiting example and regarding a group of A, B, C, D tag types without initial identification of such, all tags may be initially read and if, e.g., it is determined that A and B tag types are present, as opposed to B and C tag types, then the focus can turn to the identified A and B tag types and dynamically tune and optimize the portal/reader for these parameters.

Thus, according to embodiments, assets can be effectively and efficiently tracked, which improves inventory management. The herein disclosed methods and systems may include tagging various assets with passive transmitter tags, as explained above. These tagged assets may then be tracked/read by fixed transceivers/scanning devices, as also explained above. These scanning devices may be positioned according to the designated areas, such as at dock door 215 within a facility, and may be standard RFID fixed portals including one RFID reader and two antennas per portal, as also explained above. FIG. 8 shows a non-limiting example of fixed scanning device 219 such an RFID fixed portal 219. Fixed portal 219 can automatically read the information of a tagged asset and update this information in the cloud as the tagged asset is moved near the fixed portal 219. The fixed portal 219 may be freestanding or somewhat movable around a facility with a remote power source (e.g., battery, solar panel) and wireless networking capabilities (e.g., Wi-Fi, cellular). The fixed portal 219 may be installed or positioned as desired, and may possibly even be connected to existing lamp posts, light fixtures, lighted signs, garage doors, or other items that could structurally support a fixed portal and has an existing legacy power grid.

In some embodiments, the afore-described passive transmitter tags read by the fixed portal 219 may include unique identification information, such as a serial number. The passive/active transmitter tag and asset identification information may be scanned/read by the fixed portal 219, which may associate the asset identification information with the unique identification information of the passive transmitter tag in the databased stored in the cloud.

In some embodiments, the manufacturer may apply the passive transmitter tag to the asset. The manufacturer or a computer may automatically code or program the passive transmitter tag to include asset identifying information, to the signal that is to be transmitted by the passive transmitter tag. Fixed portal 219 may read such passive transmitter tags, as explained above, and information may be transferred to the central cloud server having program logic and a non-transitory storage medium having instructions encoded thereon that when executed by one or more processors perform operations to identify and track the asset. The central cloud server may store asset information in a format configured to easily recall and obtain information therefrom for later use.

In some embodiments, the passive transmitter tag may be an RFID chip or tag. For example, the passive transmitter tag may use the AIAG GS1 GRAI 96 RFID Tag Standard, which is flexible and allows for add-on functionality. Other transmitters associated with identifying information of an asset are also possible. The scanning device 219 may be fixed RFID transceivers and/or portals, including one RFID reader and at least two antennas per portal, as explained above. Alternatively, the scanning device 219 may each include a single antenna. The scanning device 219 may transmit the information about the asset to a central cloud server, which may be coupled to a non-transitory storage medium.

In some embodiments, the system/method may include encoding logic configured to associate the passive transmitter tag with asset identification information, such as serial number.

In some embodiments, the methods and systems herein may include software and/or other applications to be run on a computer or mobile device. For example, the systems may include a non-transitory computer readable storage medium having instructions encoded thereon, that when executed by one or more processors (which may also be referred to as "logic") track and identify the assets. The system software may allow a user to search the database stored on the cloud server for asset identification information and/or unique identification information of the passive transmitter tag via a user interface.

For example, a device in communication with the systems herein may import, scan, or otherwise receive input of, e.g., the RFID serial number for an asset. The system software may the query the database for information about a given asset. In response, the system software may display information for the asset. Software functionality may be available in the INTERIUS software. The software may be a web-based application. An instance of INTERIUS may be customized for the manufacturing facility to add extra functionality, however there are several areas that may be turnkey and available without further development. The system may use Simple Object Access Protocol (SOAP) or Representational State Transfer (REST) web services to integrate with customers as they are scalable and easily deployed but are open to other methods and have experience with the same. In some embodiments, users may view location information and produce reports via the software.

As shown in FIG. 9 and FIG. 10, according to embodiments, data may be stored in table 400 of a INTERIUS database (dynamic modulation database), accessible via a computer and/or a mobile device. FIG. 9 and FIG. 10 depict data for a door in use and a door not in use, respectively. In particular, table 400 shows stored information regarding door or portal status (active/not active), material to be loaded, settings, etc. The table 400 is presented to assist in modulating power, settings, etc. The table 400 may be displayed to a user on a dynamic user interface and may include information/data elements to modulate as further described below. As illustrated in table 400 and according to embodiments, Lane Assignment 402 concerns the function that occurs in the application to indicate that a door will be in use, and associate additional details to the transaction such as destination, carrier, etc. Thus, the presence of an active lane assignment indicates that a door is in use. Created Date 404 indicates the time and date at which the lane assignment was open and the door is in active use. A Closed Date (not shown) could also be present indicating the time and date at which the lane assignment was closed, material has been loaded and the door is no longer in use. Pick List ID 406 concerns the application generating picks for, e.g., customers/clients that instruct what to load from a material and quantity standpoint. The ID is the reference that will specifically identify what will be loaded (material, material type, quantity, etc.) on a truck or trailer during an active lane assignment. Door 408 indicates e.g., the specific dock door that will be used during an active lane assignment and with this information it can be determined what specific RFID portal/reader is involved from a modulation perspective. Origin 410 identifies the plant location of the door, also leveraged for modulation purposes. Destination 412 is ancillary to the modulation process and identifies material shipping location. Carrier 414 indicates type of transport carrier. Trailer 416 identifies the particular trailer that will be providing a transport for the loaded trailer and is also ancillary to modulation. Asset Type(s) 418 identifies what specific assets are to be loaded. Further information regarding these assets may be gained from the integration with, e.g., customer's part/pack management applications. An understanding can then be made regarding material type, dimensions weight, presence of dunnage, tag placement, tag type, etc. that allows for a refinement from a modulation perspective. Activity ID 420 indicates whether the door is active or not. Environmental ID 422 concerns environmental factors that may impact modulation such as, e.g., environmental conditions at the loading location including, e.g., presence of metal, proximity to nearest door, presence of adjacent staged material and so forth. These factors may be known based on plant site surveys. Asset types, tag types and placement may also be considered. For example, tag placement (e.g., Top, Bottom), tag model (e.g., AD383-U7, Metalcraft), tag chip (e.g., Monza 6, Monza 7), container material (e.g., Plastic A, Plastic B, Metal, ESD) and container configuration (e.g., Single Stack, Double Stack, Palletized, Nested) may be considered and set forth in the table 400. Environmental ID 422 can include unique combinations of environmental factors of a series of environmental IDs. Environmental factors of the Environmental ID 422 can be considered and impact Configuration ID 424, which is a modulation parameter including power setting, sensitivity and reader mode determined to yield the best results for each environmental ID, according to embodiments.

Power 426, Sensitivity 428 and Reader Mode 430 are further set forth in Table 400. According to embodiments, power may be set in decibels per milliwatt (dBm). The lowest setting may be 10.00 dBm and the maximum setting may be 33.0 dbM. Regarding sensitivity, a receive/sensitivity value may be the offset in dB that the reader will implement from its lowest (e.g., most sensitive) receive sensitivity to filter out tag reads if the received signal strength indicator (RSSI) is too low. The receive/sensitivity value may be 0 by default, indicating that the reader is at its lowest receive setting and thus not filtering out tag reads. The settings may range from 0 to −80, and a read with a RSSI of −80 is a stronger read than a read with a value of zero. Additionally, reader mode options may include Max throughput, Hybrid, Dense Reader M4, Dense Reader M8, Max Miller, Dense Reader M4 Two, AutoSet Dense Reader and AutoSet Static Fast.

It is further noted that the data displayed in the table 400 may be manually editable for updating based on a permissions level.

Over the Road Tracking

Thus, as noted above Internet of Things (IoT) platform (INTERIUS Database/Software Suite 201) can provide data analytics and is a proprietary cloud based software which can use RFID sensors to gather activity data, which is then used to track assets through each link in a supply chain. Suite 201 can thus utilize UHF (ultrahigh frequency) RFID or other applicable technology to localize assets within a facilities' walls, assign assets to a trailer and track the trailer in the yard. Further, according to embodiments the assets may be advantageously tracked once leaving, e.g., the customer's yard or facility.

As further detailed below, embodiments can utilize the current devices the driver or trailer possess to obtain the location of assets in the trailer, while they are on the road. Moreover, embodiments have the ability to electronically transfer the BOL and other associated shipping documents to all relevant parties through the shipping and receiving process. Through a combination of QR code scans, geofencing and driver phones or tablets, embodiments can capture the location of assets while on the road and transfer shipping documents, thereby advantageously removing paper from the solution.

Advantages of embodiments thereby address the problem that there is a lack of asset visibility in the supply chain by providing visibility to assets within all stages of the supply chain.

Embodiments can create increased productivity by decreasing the lack of down time, asset loss and abnormal shipments by providing traceable insights, which allow for proactive decision making for the customer. Embodiments remove the need for a paper BOL and shipping documents, removing lost paperwork, and helping the environment.

Utilizing the afore-described lane assignment creation features within the INTERIUS software Internet of Things (IoT) platform (INTERIUS Database/Software Suite 201) and asset loading onto a trailer, the trailer may then also be tracked once it leaves the facility by securely connecting to a driver's device while utilizing the electronic BOL populated with the details of the assets loaded on the trailer. This can autonomously transfer the shipping information and track the location of the assets in the trailer, as further explained below.

Figure 11:
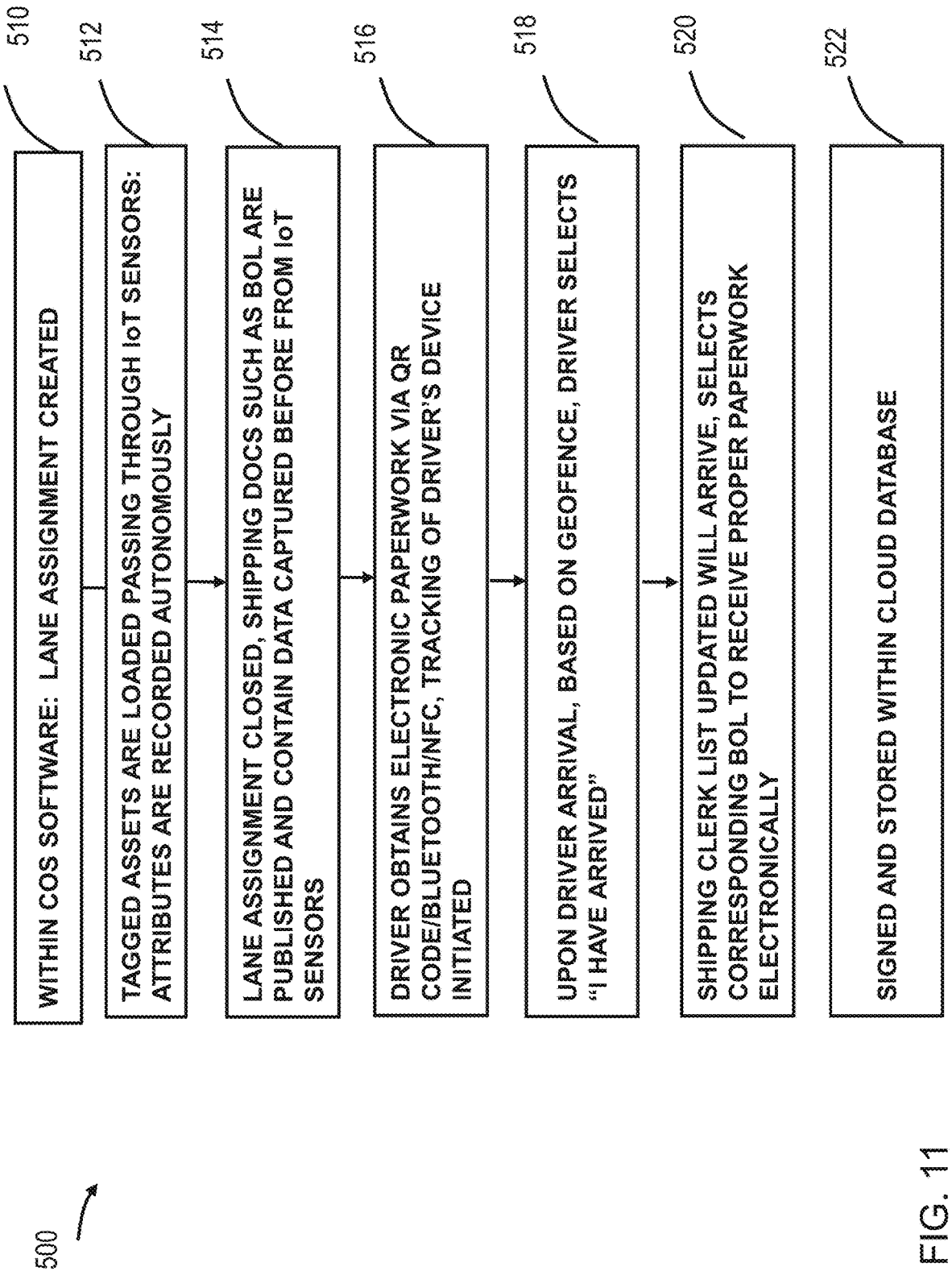
FIG. 11 is a diagram of a flow chart illustrating a method of processing transportation and shipping documentation, according to embodiments.

Referring now to FIG. 11, FIG. 11 is a diagram of a flow chart illustrating a general overview of a method 500 of processing transportation and shipping documentation, according to embodiments. For example, when a delivery is schedule at 510 in INTERIUS software Internet of Things (IoT) platform (INTERIUS Database/Software Suite 201), a user can create a lane assignment, as noted above. Upon beginning to load the trailer with tagged assets passing through the IoT sensors located at, e.g., the dock as also explained above, attributes thereof may be recorded autonomously at 512. When the lane is open, any commissioned asset that is read at that portal is added to the lane assignment. When the lane assignment is closed at 514, all of the assets are then totaled and reported on the BOL including any other shipping documents (creation of BOL including any other shipping documents). These documents may be published/printed and contain data captured before from the IoT sensors. The driver may obtain the electronic paperwork (BOL and any other shipping documents) via a QR code, Bluetooth, NFC, etc., and the tracking of the driver's device initiated at 516. At 518 upon arrival of the desired destination and based on geofence, the driver can select, e.g., "I have arrived" on its driver's device, such a mobile phone or tablet. A shipping clerk list update will then arrive for selection of the corresponding BOL to receive the proper paperwork electronically, as shown at 520. This electronic information may be signed and stored within the cloud database, as noted at 522. Details of embodiments of the herein methods and systems are further described below with reference to FIGS. 12, 13 and 14, which set forth various non-limiting example scenarios.

Figure 12:
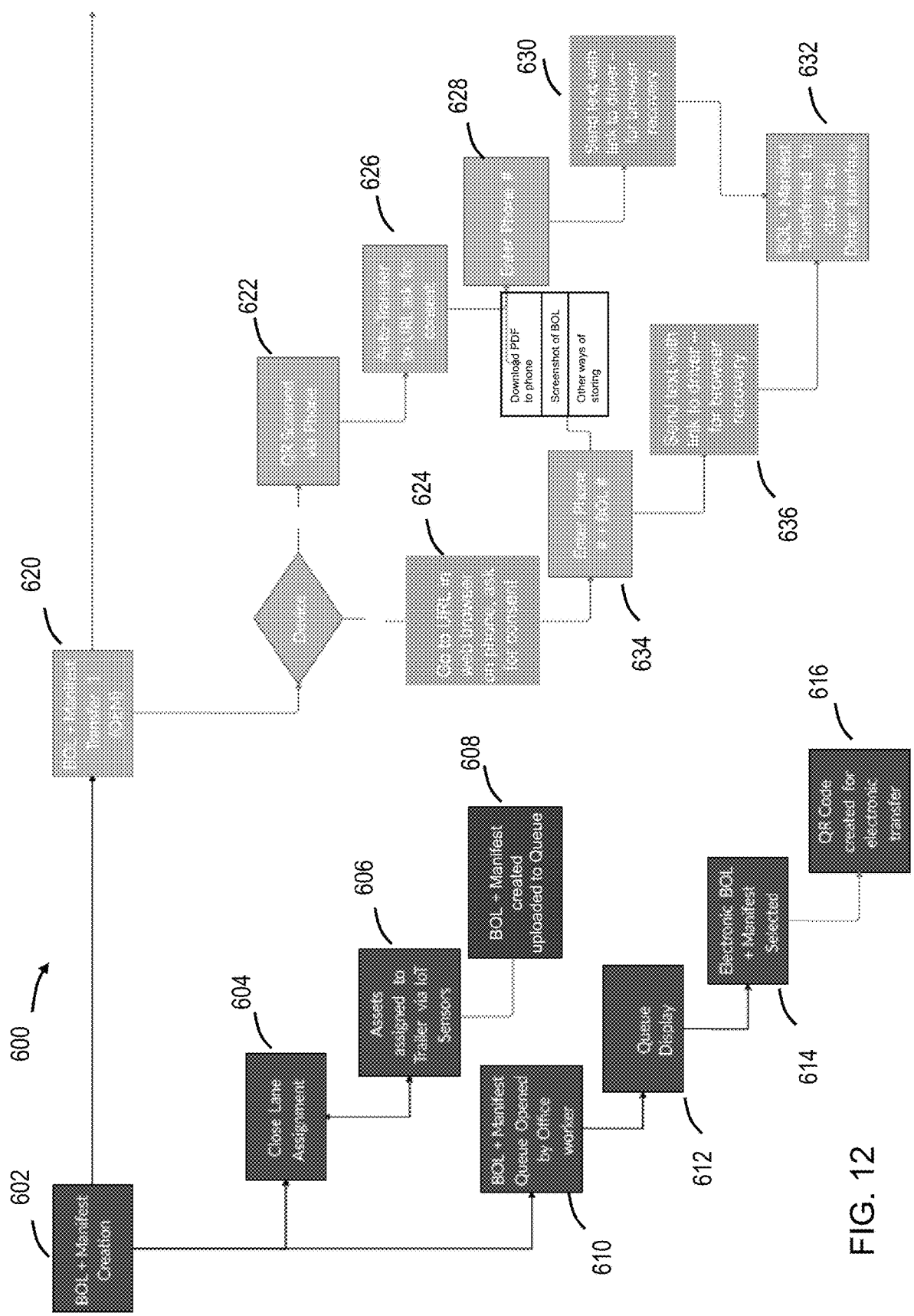
FIG. 12 is block diagram of a flowchart illustrating a method/system of processing transportation and shipping documents beginning with manifest creation, according to embodiments.

FIG. 12 is a block diagram of a flowchart illustrating a method/system 600 of processing transportation and shipping documents beginning with manifest creation, according to embodiments. According to embodiments, the method may begin at 602 with the creation of the BOL and manifest. Again, a bill of lading (BOL) may herein refer to an official shipping or legal document that specifies the contents of a trailer, the shipping/receiving parties and other shipping language. BOL plus may herein refer to all of the shipping documents for a lane assignment, which may refer to the method employed with use of Interius software to create a trailer route from the origin of the lane assignment (OEM) to suppliers, including BOL and other associated documents. A manifest may refer to a master shipping document for a lane. It may include all shipping documents that are on the load. When a manifest is referenced, it may be considered the parent for the lane and may have multiple child documents, and include but not limited to BOL's, customer paperwork, agricultural documentation etc. Such documents may be tailored to the customer's needs and solutions.

At 602 of FIG. 12, the afore-described IoT sensors may be employed in loading a truck or trailer with tagged asserts and create a lane assignment (e.g., route) within the COS software. Thus, a facility can open a lane assignment with assets loaded onto a particular trailer or truck wherein each tagged assets may be read at the RFID portal, as also previously described and assign the assets to that trailer 606. After a lane assignment is closed (see 604), the BOL plus documents and manifest may be created at 608 and uploaded to the cloud. In COS, these documents may be stored in their respective queue list. The queue list may be visible to the OEM and supplier based on the information provided by the system. Thus, this information may be available to be viewed, e.g., first by the OEM shipper and then the receiving party may then have access to the BOL and other associated documents so they know what to expect upon arrival. At 610, 612, 614 and 616, the OEM, e.g., may enter its system and review all of the BOL, manifest or other shipping documents for the desired period of time such as day, week, etc., and take action of the desired loads, such as view or print, transfer to a driver, or push a text to the person who received the BOL. On the receiving end, each supplier may have its own BOL list available for the desired time period and can thus view information such as expected arrival, time, date, expected assets loaded on the BOL, add alerts regarding delays, view the queue and take action. For example, at 614, the electronic BOL and manifest may be selected to transfer that information to the driver from the OEM (point of origin). At 616, a QR code may be created for the transfer. For example when the BOL and manifest is transferred to the driver, a unique QR code may then be created that can take the driver to a screen that display wherein the driver may receive a prompt requesting entry of phone number (see start of 620). Accordingly, the driver using the driver device such as a tablet or mobile phone may scan the QR code at 622 or at 624 go to the URL (e.g., ElecBOL.com) in web browser if, e.g., the camera did not work to successfully scan the QR code at 622. If the QR code scan was successfully scanned, the driver may receive upon consent to track driver's device a prompt with a URL to input phone number 628 so, e.g., a text message 630 may be sent to the phone with a link to the BOL information in case the web browser is closed during the trip. Consent to track the driver's drive may be requested at 626. If consent is not given, the actual paper documents may need to be relied on. If consent is given, then 628, 630, 632 may be completed as noted above. Again, if there are issues with scanning the QR code, the driver may go to a URL as shown at 624 and upon provide consent, may similarly receive a prompt at 634 requesting entry of phone number to receive a text message 636 and then, e.g., BOL and manifest transferred to driver's interface (screen) and the cloud.

Figure 13:
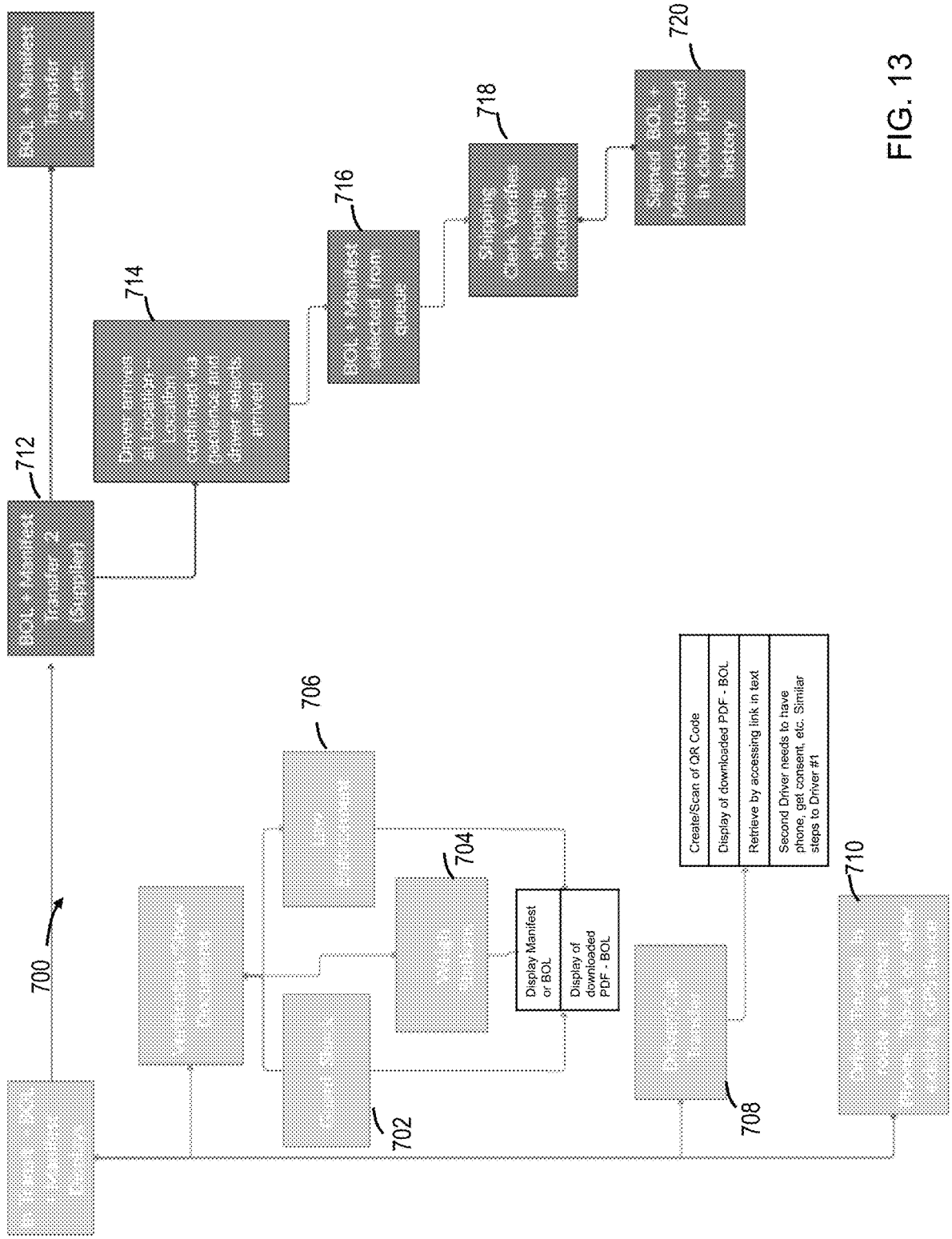
FIG. 13 is a block diagram of a flowchart illustrating a method/system of processing transportation and shipping documents in transit, according to embodiments.

Referring now to FIG. 13, FIG. 13 is a block diagram of a flowchart illustrating a method/system 700 of processing transportation and shipping documents in transit, according to embodiments. As shown therein, a driver may have multiple options to view the BOL, transfer the BOL to another driver. FIG. 13 illustrates four examples of points to view options for transfer. For instance, at guard shack 702 the driver can show the BOL or transfer the BOL to the guard shack, or show/verify at weigh station 704 or with law enforcement 706. The information could also be transferred to another driver at 708. As noted at 710, the loaded assets may be tracked via driver's smart phone, tablet or existing GPS device. Advantageously, these transfers may be completed via an in transit driver's app on a mobile device of the driver (web app).

When the driver arrives at the supplier location 712, the transfer process may begin and there may be multiple stops and possibly multiple suppliers on a route. When the driver arrives at, e.g., the first location confirmed via a geofence 714, the queue list is selected updated for status and the driver may be prompted to acknowledge arrival and ready to transfer the BOL at 716, at which point a shipping clerk could select from the queue the BOL/manifest they want to receive, verify/sign the BOL/receipt 718 and the signed documents sent back to the driver via email and stored in the cloud at 720.

Figure 14:
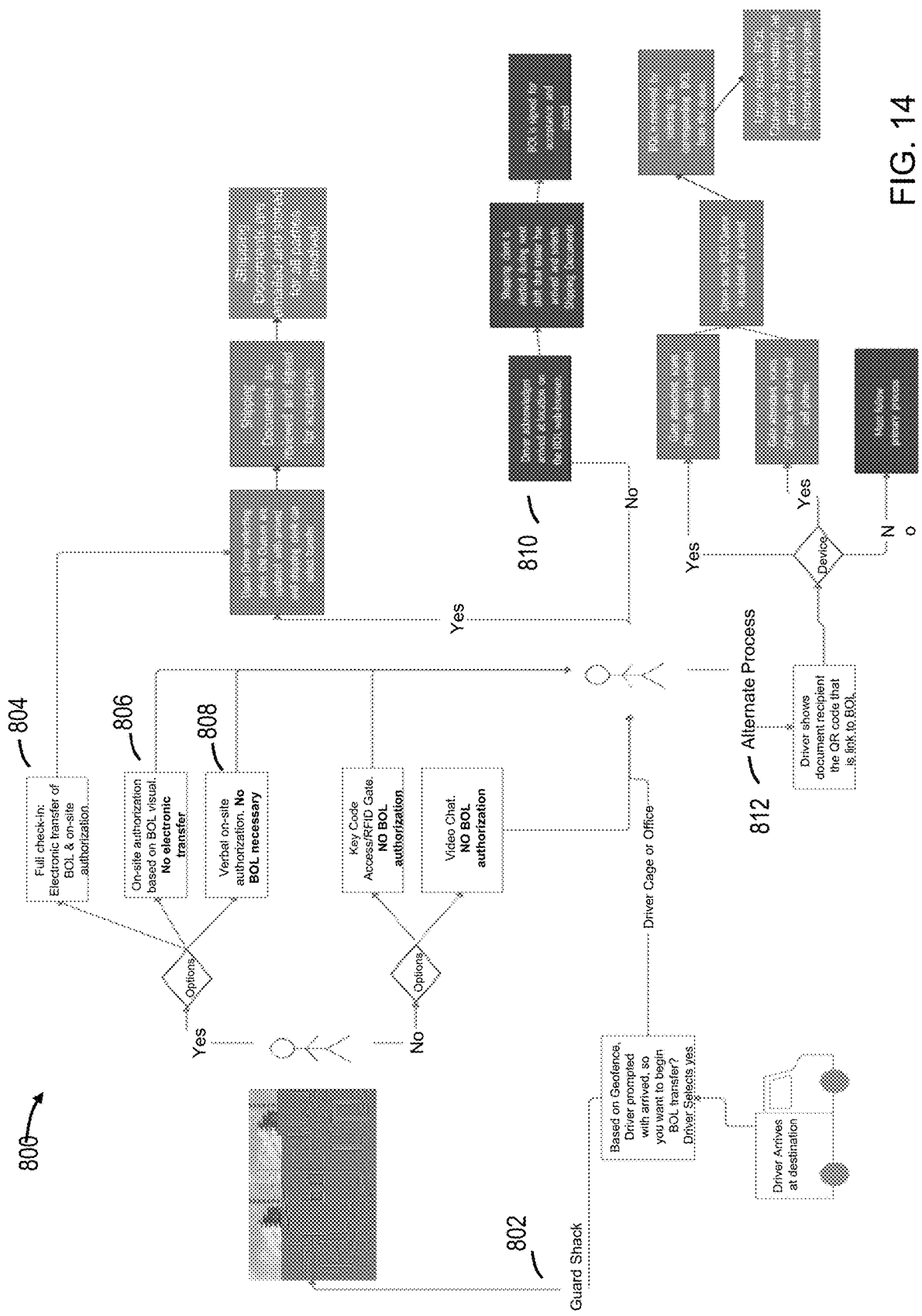
FIG. 14 is a block diagram of a flowchart illustrating a method/system of processing transportation and shipping documents, according to another embodiment.

Referring now to FIG. 14, FIG. 14 is a block diagram of a flowchart illustrating a method/system 800 of processing transportation and shipping documents, according to another embodiment and showing various examples of non-limiting scenarios therein. Again, the possible scenarios depicted therein are merely examples and not meant to be limiting. For instance, the driver may arrive a guard shack at 802 wherein a person may be present at which point the driver may have the following non-limiting options 804) full check in of electronic transfer of BOL and on-site authorization, 805) on-site authorization based on visual of BOL, and 806) verbal on site-authorization. As shown in FIG. 14, during step 804 (full check-in), the driver may show the QR code to, e.g., a guard who scans the QR code or goes to the supplier queue list and selects the load and BOL number. Also, upon the driver selecting, e.g., arrive, the queues may be updated with arrived status and a shipping clerk at the location may select transfer. The shipping documents can then be reviewed and signed for acceptance, followed by the shipping documents being emailed and stored for all applicable parties in the cloud/database.

Alternatively at 810 of FIG. 14, the drive may acknowledge via phone that the driver has arrived at the destination and is ready to complete the transfer. As a further example, if there is no person at the initial guard shack 802, the driver may swipe a key code for access or, e.g., employ video chat, as shown therein. Further non-limiting examples of alternative scenarios are also depicted therein. For instance, as depicted in the alternate process embodiment at 812, the driver may show the document receipt/QR code that is the link to the BOL and the gate attendant may scan the QR code with a cell phone or with a handheld reader. Upon successful scanning, the BOL queue may be updated as arrived. The BOL may be retrieved by selecting the corresponding BOL from the queue, and upon successful scanning, the BOL queue is updated as arrived and stored for historical data in the cloud.

Thus, as can be seen from the foregoing non-limiting descriptions, embodiments of the invention can advantageously provide more visibility to assets throughout the supply chain, linking assets to an electronic BOL, assigned assets to a BOL such that it can be determined which particular assets (serialized parts) are on the trailer or truck. Advantageously, this may be completed automatically by sensors without human intervention to assign thereby achieving a point-to-point hand off of serialized parts. Advantageously, embodiments of the invention can assign a particular serial number to each asset of assets that are the same or of a different type.

Thus, as can be seen from the foregoing descriptions, the inventors have developed a unique method and system of using an electronic bill of lading (BOL) using IoT sensor devices to scan the tagged assets as the assets are loaded into the trailer or truck, wherein the electronic BOL is also populated with the tagged asset information (e.g., serial numbers) with use of the IoT sensor devices. Embodiments thus populate to the electronic BOL based on what assets are actually being loaded onto the trailer or truck with the use of the afore-described IoT sensor devices positioned at the dock during loading. As described above, an ultra-high frequency (UHF) RFID tag may be affixed to each asset to be loaded and when the tagged asset is loaded, the IoT sensor devices read the tagged assets and assign those assets to the particular trailer. While RFID sensors may be preferred, a Bluetooth beacon could be affixed to the vehicle and as assets affixed with a Bluetooth tag are loaded onto the vehicle, the beacon could associate that particular asset similar to the descriptions for the RFID sensors.

Embodiments can employ a driver's device such as a smart phone, tablet or other device with an internet connection to, e.g., 1) transfer information to the BOL and 2) track the trailer via the driver's device to the supplier and along the journey.

For instance, according to embodiments, when a driver drives its trailer loaded with assets into its destination facility (e.g., supplier facility), a BOL is assigned to the driver's device at which point and upon consent by the driver's device can be tracked. As the driver gets closer to the desired destination, the tracking may include more frequent pinging to determine its location, such as pinging every 30 minutes if 5 miles away, pinging every minute if closer, and so forth. When the driver arrives at the destination of, e.g., the supplier a geofence can be entered thereby creating a zone in which some action may now be taken. More particularly, a geofence may be understood as a virtual geographic boundary defined by, e.g., GPS, than enables software to trigger a response when a device, such as a mobile device, enters or leaves a particular area. As a non-limiting example, when the driver gets within 1 mile of the supplier facility, it will trigger the supplier and advise that the supplier has an arriving trailer to receive, the driver is contacted and the supplier can now receive the electronic paperwork which is then transferred by the driver.

As also described above the driver may get an alert via a web browser or an electronic notification on the driver's phone or tablet that was initially signed up for at the loading facility. When the driver prompts and indicates to transfer the BOL at the destination, the shipping clerk can advantageously pull up the BOL and verify receipt, with all of the BOL and related shipping documentation advantageously being all electronic. The shipping clerk may then put the needed signatures in, verify receipt of the shipment in database with the BOL and other relating shipping documents.

Advantageously, embodiment can transfer the BOL through QR code scans or other wireless scans such as through the cloud, and also linking in, e.g., a GPS and tracking where the BOL is also along the route via a driver's device. Typically a driver has a device, but the device is separate and only visible to the driver's employer. Here, embodiments advantageously can add no additional hardware to the driver in order for the driver's device to be tracked by a third part. Thus, embodiments can employ a QR code for transfer of the information or Bluetooth NDS to transfer thereby effectively enabling transfer of the BOL wirelessly from start to finish.

Embodiments advantageously can link shipping information to a tracking device (driver's device such as phone or tablet), but is not limited to a driver's cell phone. For example, open API may be employed to use additional devices a driver may have such as a GPS tag and/or something in the vehicle already that can pull location information and link the electronic BOL to a specific device.

Accordingly, embodiments advantageously provide the loading of a truck or trailer with tagged assets which are scanned upon loading such that exactly what is loaded on the truck or trailer is identified/known. An electronic BOL can then be populated with that asset information, and the BOL can be tracked via a driver's device from start to finish of the journey. Autonomous transfer of the information can occur on arrival without relying on the driver to indicate arrival and instead use geofences to indicate the arrival and identification of arriving assets.

Accordingly, embodiments of the invention can provide a method and system employing secure web-based applications designed to, e.g., electronically handle and store the BOL plus information, track the asset locations, and provide visibility to the asset's location to the OEM and Suppliers. As described above, embodiments can address various functional areas including but not limited to: INTERIUS lane assignment creation/completion; driver receipt of BOL plus; in-transit tracking; in-transit screen; driver transfer; recipient's receipt of BOL plus; and storage of BOL plus. Embodiments may also provide actionable insights and alerts to necessary parties of potential delays.

Set forth below are further details regarding various examples and further possible embodiments of the herein methods and systems.

INTERIUS Lane Assignment/Completion

According to embodiments and further to the above descriptions, when a lane assignment is closed the BOL plus documents may be created. In COS, these documents may be stored in their respective queue list. The queue lists may be visible to the OEM and supplier based on the information provided by the system. According to embodiments, the OEM queue lists may be visible to the OEM only and provide information into all closed outbound lane assignments in the process. The OEM may have a queue list for all BOL plus documents. It may also have its own set of functionalities, as further described below. A Supplier queue list may be viewable as a filtered list for inbound lane assignments to that supplier only. It may include all BOL plus documents for that supplier, except a manifest queue list according to embodiments. Supplier queue list's may also have their own set of functionalities defined below.

As the lane moves through the process, it may be tracked via the status of the lanes. The statuses may provide needed or desired information for the end uses to take actions. The statuses may include the information set forth below in Table 1.

TABLE 1

| Example Statuses |
| --- |
| Ready to Ship |
| In-Transit EBOL (electronic bill of lading) |
| In-Transit PW (paperwork) |
| Arrived |
| Transfer Pending |
| Delivered |
| Complete |

Further to above, the OEM may have a queue list for each of the BOL plus documents. The functionality may be different for each queue list. For example, the user may be able to push a text for a manifest, but not for a specific document according to some embodiments. These lists may be populated via the closing of a lane assignment, and documents may be viewable in the queue until received by the Supplier. At this point, the information could be moved to a history list where the information is stored including signature. This list could have functional buttons such as "transfer" used to start the transfer process; "view/print" used to view/print existing documents for, e.g., that column; and "push" used to push a test with a link to the manifest to the driver's provided number.

Non-limiting examples of manifest fields include Manifest number; OEM origin; Number of stops; Expected ship date; Expected arrival at the final-destination; Status; Manifest; BOL's Transfer manifest; Push manifest; and others based on customer's needs.

Similarly, non-limiting examples of fields in the OEM BOL Queue list include: Manifest Number; BOL Number; Origin; Ship Date; Expected Arrival; Destination; Status; View/Print BOL; and others based on customer or other shipping needs.

A Supplier BOL Queue List may show any inbound shipments the supplier has coming in and can have functional buttons such as "view" wherein the driver can view documents that are planning to come to their facility; and "receive" which could be greyed out until the driver makes the transfer to the receiving party. The BOL Queue List can include Manifest number; BOL number; Origin, Ship date, Expected arrival; Destination; Status; View/Print BOL; Receive BOL; and other fields based on customer or other shipping needs.

When a driver arrives at a facility to pick up their trailer, the driver may proceed to a shipping clerk. The shipping clerk may initiate the transfer process by selecting the "Transfer" button on the manifest queue list. This will enable the tracking process and the electronic transfer of documents.

Once the shipping clerk selects the "Transfer" button, a QR code may be created for the driver to scan with their smart device. The QR code may be displayed on the screen or kiosk, and act as a secure and direct link to the BOL plus for the driver. The screen may display a QR Code (direct link to electronic documents); a Manifest Transfer Number (which may be a unique randomly generated number); and a URL (input URL for the driver to go to if the QR code will not scan). The screen may then display a QR Code, which is a direct link to the electronic documents; a Manifest Transfer Number, which is typically a unique randomly generated number; and a URL to input for the driver to go to if the QR code will not scan, as noted above. As shown above with respect to the embodiment of FIG. 12, options that may be followed from this screen: 1) Driver successfully acquires the QR Code; or 2) Driver goes to the URL listed. Upon successful scan of the QR Code, the driver may be prompted to provide consent for track such as via a consent screen. The driver may have the option to select "yes" or "no", as well as view the terms and conditions of the tracking solution. If the driver selects Yes, the driver can be taken to the phone number input screen 900 as shown in FIG. 15. The status can then update to "In-Transit EBOL" and the driver can input their phone and select submit. Selecting submit can lead to the "In-Transit" Tracking Screen 950 shown in FIG. 16.

When the driver is taken to the "In-Transit" screen 950 the driver may be sent an automated text to their device with a link to the "In-Transit" screen 950. This link is so the driver can have access if the driver closes the browser and losses the website. The phone number is advantageously stored on the back end, so an OEM clerk may have the ability to "Push" the text message back to the driver if they delete the text. The clerk does not have access to seeing the number according to embodiments. If the driver does not want to provide their number and selects "I do not Consent", there may be a warning screen that pops up and indicated, e.g., "You will be unable to recover the electronic BOL information if you close the browser. Are you sure you want to proceed? 'Yes' or 'No.'" If the driver Selects "No" and does not give consent to tracking, the driver may be prompted with an are you sure message. If the driver the driver selects "Yes" the driver may be prompted with, e.g., "You are not following standard procedure. Please gather necessary printed paperwork." The OEM's COS may then be alerted to print paperwork and the lane flagged as not being tracked. The status may then be "In-Transit-PW." If the driver selects "No" the driver may be taken back to the consent screen and follow the process from there.

Figure 17:
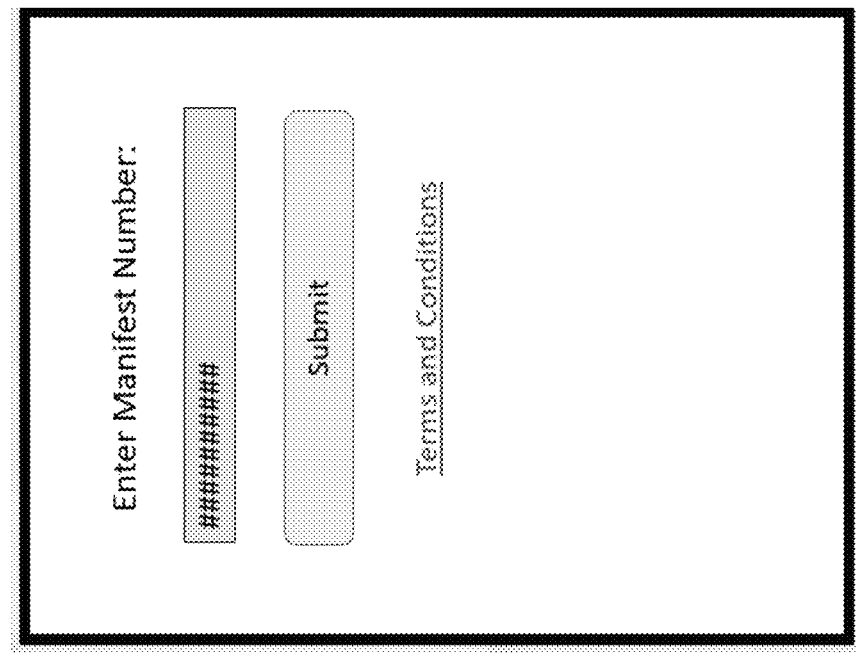
FIG. 17 is a diagram of an electronic bill of lading screen employed in embodiments.

If the driver's device is unable to scan the QR code for any reason, the driver may have the option to go to a yet to be determined URL to manually transfer the BOL plus information. The yet to be determined Website can follow the foregoing according to embodiments: First, the driver may enter the URL and taken to a page, such as an ElecBOL screen 960 shown in FIG. 17. The driver may input a unique randomly generated manifest number from the screen and click submit. Upon entering the manifest number, the driver may be taken to a consent screen and follow thereof.

Upon acceptance of tracking for the lane, embodiments may be employed to track the driver's device's location. Location update rates may be dependent on the distance from the end destination (if possible) and a non-limiting example of GPS ping rates is set forth below in Table 2

TABLE 2

| Distance from Destination (miles) | Ping Rate | Accuracy |
|---|---|---|
| 0 < 49 | 5 minutes | Real-time |
| 50 < 99 | 10 minutes | Real-time |
| 100 < 200 | 20 minutes | Real-time |
| 200< | 30 minutes | +/−10 miles |

Figure 16:
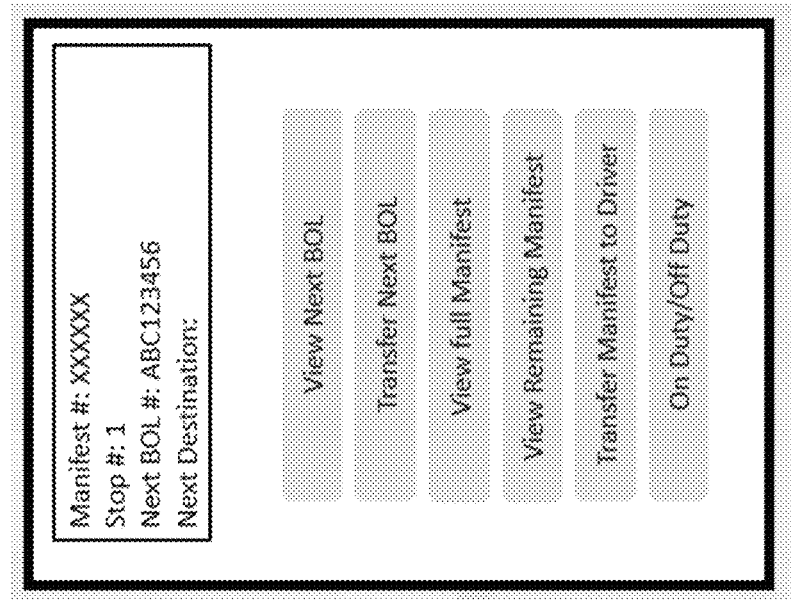
FIG. 16 is a diagram of an in-transit tracking screen employed in embodiments.

Referring again to the exemplary In-Transit screen 950 of FIG. 16, screen 950 may be a secure, unique webpage to the particular lane for the driver to use to navigate through their shipping information. Each displayed button may have a specific function to the driver as noted therein. For instance, "View Next BOL" may download/open a PDF of the BOL for the next stop and can be used for verification; "Transfer Next BOL" may begin the transfer process for the next BOL; "View Full Manifest" may pull up a list of all BOL's for the manifest; "View Remaining Manifest" may pull up a list of all BOL's for the manifest.

Throughout the transit process for a load, the driver may handoff the trailer to another driver. This may not happen often, especially in direct shipments. However, embodiments may follow the same process as the initial transfer with, e.g., the initial driver selecting "Transfer Manifest to Driver" in their In-transit Screen. This may generate a QR code, as similarly described for the initial driver receipt. The new driver may scan the QR code and follow the same process as the initial driver detailed above. If the drivers are unable to meet in person the BOL information will be able to be transferred via text, email or in a similar manor.

When the driver arrives at a supplier, the driver may transfer the electronic paperwork to the supplier. For example, upon driver arrival within the geofence of the supplier property the status of the BOL plus may change to "arrived" for that supplier. The driver's "in-transit" screen may then be prompted with you have arrived at your destination, and the driver can then transfer the BOL plus to the supplier. If the driver is not within the geofence of the Supplier, the driver may be prompted with "You are not at within the geofence of the correct destination. Are you sure you want to proceed?" If the driver indicates yes, the BOL plus Queue List may be updated with a functional receive button. If the driver indicates no, the website may go back to the in-transit screen. If the driver is within the geofence of the Supplier, the driver may begin the transfer process. Thus, the BOL plus queue list may be updated with a functional receive button, and the status changed to indicate the arrival. Once the driver has transferred the documentation, the shipping clerk may then select the receive BOL button. The BOL information may be made viewable for the shipping clerk. The shipping clerk may then "Accept" or "Reject" the BOL. If the shipping clerk "Accepts" the BOL the clerk may sign for it. If the shipping clerk "Rejects" the BOL then it may goes back to the driver's list. Once the driver has successfully transferred the BOL plus, the driver may be prompted to email the signed paperwork back to the shipping company. All BOL plus paperwork for the entire lane could also be e-mailed to the shipping company.

The BOL plus history may be stored in INTERIUS Database 101 for historical purposes with the signee and other information for applicable parties such as the OEM, Supplier and Trucking Company.

Accordingly, embodiments of the disclosure solve numerous problems and create over the road visibility for tractor trailers in a highly scalable fashion. Some problems that may be solved advantageously include elimination of hard copies or actual paperwork of the BOL plus; more accurate BOL's using IoT sensor acquisition to populate the BOL plus details, such as material, quantity, etc.; traceability and recovery of BOL plus details, wherein lost paperwork no longer becomes an issue; historical access to all BOL's; and a common platform to accept localization from any existing GPS platform by any carrier, providing visibility to all trailers in one platform.

Moreover, embodiments can leverage a mobile device to provide tracking/localization and thus introduce a scalable efficient and economical way to obtain over the road localization in real-time. It is noted that the industry has struggled to find a way to install or provide the needed infrastructure to equip trailers and/or drivers to provide accurate and current real time location data. By using a mobile device and connecting contents to a trailer, trailer to driver visibility may be enabled with, e.g., the company/driver's acceptance of a BOL and acceptance of any privacy terms.

Still further, in addition to providing an option for localization that leverages a cellular enabled mobile device, embodiments of the platform may be constructed in such as way that will accept trailer location from any GPS device through a common API and data transmitted via cellular communication protocols, thereby advantageously allowing for the tracking of all associated trailers in one common platform.

According embodiments of the disclosure may provide additional value and advantages by, e.g., providing an option for over the road visibility that leverages a common platform, e.g., GPS and cellular enabled mobile devices; allowing for the aggregation of any form of GPS over the road visibility through a universally available API; allowing both large and small carriers to participate with minimal barrier to participation; providing visibility to trailers over the road to both the shipper and designee for all associated shipments; and providing a gateway to proactive decision making based off of autonomous digitized data, among other advantages and benefits.

Logic", as used herein, may include but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of systems described herein may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

Accordingly, in some embodiments, a method of processing transportation documentation using an electronic bill of lading comprises identifying in a structure a plurality of different assets to be loaded; wherein each asset of the plurality of different assets is of a known identification and includes a RFID tag, and all RFID tags of the plurality of different assets are not the same. The method also comprises identifying a selected structural opening of a plurality of structural openings to be utilized with loading of the plurality of different assets onto a vehicle, wherein each structural opening of the plurality of structural openings is equipped with an RFID portal including a reader antenna, and each RFID portal includes at least power, sensitivity, mode and off settings; and individually, tuning the power, sensitivity and mode settings of the RFID portal of the selected structural opening based on the known identification of the plurality of assets and RFID tags utilized in the selected structural opening such that the reader of the RFID portal of the selected structural opening reads the RFID tag of the plurality of different assets, and obtain asset details including asset serial number thereby reading and identifying the assets loaded onto the vehicle. The method further comprises populating the electronic bill of lading and associated shipping documents with the obtained asset details of the assets loaded onto the vehicle using the portal of the selected structural opening; and tracking the assets loaded onto the vehicle in route to a destination with use of a driver's device, wherein the populated electronic bill of lading is transferred to the driver's device.

In some embodiments, the structural openings are dock doors, and the method further comprises identifying inactive dock doors not receiving the assets, and individually, tuning each RFID portal of the inactive dock doors to the off setting or reduced power and sensitivity settings in order to conserve resources.

In some embodiments, the assets include automotive asset.

In some embodiments, the portal includes a reader antenna configured to transmit an interrogation signal, and each RFID tag includes a tag antenna configured to receive the interrogation signal and, in response to receiving the interrogation signal, provide an identification (ID) response representing an identity of the respective RFID tag, and further dynamically tuning the power, sensitivity and mode settings.

In some embodiments, the method further comprises initiating a lane assignment for the selected dock door and identifying the selected dock door as active.

In some embodiments, the asset details further comprise at least one of asset material, asset size, quantity, tag location, tag type, tag model and tag chip type.

In some embodiments, a QR code is provided for the driver to scan to transfer the populated electronic bill of lading to the driver's device.

In some embodiments, the method further comprises upon arrival at the destination transferring the populated electronic bill of lading to a shipping clerk at the destination for verification of shipment.

In some embodiments, the driver's device is a mobile phone or tablet.

In some embodiments, the populated electronic BOL further comprises associated shipping documentation all in paperless form.

In some embodiments, a system for processing transportation documentation using an electronic bill of lading comprises a plurality of different assets configured to be loaded; wherein each asset of the plurality of different assets is of a known identification and includes a RFID tag, and all RFID tags of the plurality of different assets are not the same; and a plurality of RFID portals. The system is configured to identify a selected structural opening of a plurality of structural openings to be utilized with loading of the plurality of different assets onto a vehicle, wherein each structural opening of the plurality of structural openings is equipped with an RFID portal including a reader, and each RFID portal includes at least power, sensitivity, mode and off settings. The system is also configured to individually, tune the power, sensitivity and mode settings of the RFID portal of the selected structural opening based on the known identification of the plurality of assets and RFID tags utilized in the selected structural opening such that the reader of the RFID portal of the selected structural opening reads the RFID tag of the plurality of different assets, and obtain asset details including asset serial number thereby reading and identifying the assets loaded onto the vehicle. The system is further configured to populate the electronic bill of lading with the obtained asset details of the assets loaded onto the vehicle using the portal of the selected structural opening; and to track the assets loaded onto the vehicle in route to a destination with use of a driver's device, wherein the populated electronic bill of lading is transferred to the driver's device.

In some embodiments, the structural openings are dock doors, and the system is further configured to identify inactive dock doors not receiving the assets, and individually, tune each RFID portal of the inactive dock doors to the off setting or reduced power and sensitivity settings in order to conserve resources.

In some embodiments, the assets include automotive assets.

In some embodiments, the portal includes a reader antenna configured to transmit an interrogation signal, and each RFID tag includes a tag antenna configured to receive the interrogation signal and, in response to receiving the interrogation signal, provide an identification (ID) response representing an identity of the respective RFID tag, and the system is further configured to dynamically tune the power, sensitivity and mode settings.

In some embodiments, the system is configured to initiate a lane assignment for the selected dock door and identify the selected dock door as active.

In some embodiments, the asset details further comprise at least one of asset material, asset size, quantity, tag location, tag type, tag model and tag chip type.

In some embodiments, the system is configured to provide a QR code for the driver to scan to transfer the populated electronic bill of lading to the driver's device.

In some embodiments, upon the vehicle arrival at the destination, the system is configured to transfer the populated electronic bill of lading to a shipping clerk at the destination for verification of shipment.

In some embodiments, the driver's device is a mobile phone or tablet.

In some embodiments, the populated electronic BOL further comprises associated shipping documentation all in paperless form.

In some embodiments, a method of dynamic radio frequency identification (RFID) modulation comprises identifying in a structure a plurality of different assets to be loaded or unloaded; wherein each asset of the plurality of different assets is of a known identification and includes a RFID tag, and all RFID tags of the plurality of different assets are not the same. The method also comprises identifying a selected structural opening of a plurality of structural openings to be utilized with unloading or loading of the plurality of different assets, wherein each structural opening of the plurality of structural openings is equipped with an RFID portal including a reader, and each RFID portal includes at least power, sensitivity, mode and off settings; and individually, dynamically tuning the power, sensitivity and mode settings of the RFID portal of the selected structural opening based on the known identification of the plurality of assets and RFID tags utilized in the selected structural opening such that the reader of the RFID portal of the selected structural opening reads every RFID tag of the plurality of different assets to avoid missed reads.

In some embodiments, the method further comprises identifying time and date a transport vehicle is arriving at the selected structural opening for the unloading or loading and performing the individually, dynamically tuning at the time and date.

In some embodiments, the structural openings are dock doors and the method further comprises identifying which selected structural openings of the plurality of structural openings are inactive and not receiving a transport vehicle for the plurality of different assets to be loaded onto or off of the transport vehicle at the time and date, and individually, dynamically tuning each RFID portal of the inactive dock doors to the off setting or reduced power and sensitivity settings in order to conserve resources.

In some embodiments, the assets include assets include automotive assets.

In some embodiments, the assets include containers for automotive parts.

In some embodiments, the structure includes at least one of a warehouse, a supplier facility and a manufacturing facility.

In some embodiments, the portal includes a reader antenna configured to transmit an interrogation signal, and each RFID tag includes a tag antenna configured to receive the interrogation signal and, in response to receiving the interrogation signal, provide an identification (ID) response representing an identity of the respective RFID tag.

In some embodiments, the portal includes two reader antennas.

In some embodiments, the dynamically tuning further comprises initiating a lane assignment for a selected dock door and identifying the selected dock door as active.

In some embodiments, the dynamically tuning further comprises identifying content of the assets to be loaded or unloaded, wherein the content comprises at least one of asset material, asset size, quantity, tag location, tag model and tag chip type.

In some embodiments, the dynamically tuning further comprises evaluating the content of the assts in combination with an environmental identification (ID) indicating environmental factors, wherein the environmental factors include at least one of temperature, humidity, and activity at an adjacent door.

In some embodiments, an edge device management system for dynamic radio frequency identification (RFID) modulation comprises a plurality of different assets configured to be loaded or unloaded; wherein each asset of the plurality of different assets is of a known identification and includes a passive RFID tag, and all passive RFID tags of the plurality of different assets are not the same. The edge device management system also comprises a plurality of RFID portals including a reader; wherein the edge device management system is configured to identify a selected structural opening of a plurality of structural openings to be utilized with loading or unloading the plurality of different assets, wherein each structural opening of the plurality of structural openings is equipped with an RFID portal of the plurality of RFID portals including a reader, and each RFID portal includes at least power, sensitivity, mode and off settings; and wherein the edge device management system is further configured to individually, dynamically tune the power, sensitivity and mode settings of the RFID portal of the selected structural opening based on the known identification of the plurality of assets and RFID tags utilized in the selected dock door such that the reader of the RFID portal of the selected structural opening reads every RFID tag of the plurality of different assets to avoid missed reads.

In some embodiments, the edge device management system is further configured to identify time and date a transport vehicle is arriving at the selected structural opening and perform the individually, dynamically tuning at the time and date.

In some embodiments, the structural openings are dock doors and the edge device management system is further configured to identify which structural openings of the plurality of structural opening are inactive and not receiving a transport vehicle for the plurality of different assets to be loaded onto or off of the transport vehicle at the time and date, and individually, dynamically tune each RFID portal of the inactive dock doors to the off setting or reduced power and sensitivity settings in order to conserve resources.

In some embodiments, the assets include automotive assets.

In some embodiments, the assets include containers for automotive parts.

In some embodiments, the portal includes a reader antenna configured to transmit an interrogation signal, and each RFID tag includes a tag antenna configured to receive the interrogation signal and, in response to receiving the interrogation signal, provide an identification (ID) response representing an identity of the respective RFID tag.

In some embodiments, the portal includes two reader antennas; and the edge device is configured to communicate with the plurality of RFID portals.

In some embodiments, the edge device management system is configured to receive production demand data, asset data and transportation data.

In some embodiments, the system is further configured to initiate a lane assignment for a selected dock door and identifying the selected dock door as active.

In some embodiments, the system is further configured to identify content of the assets to be loaded or unloaded, wherein the content comprises at least one of asset material, asset size, quantity, tag location, tag model and tag chip type.

In some embodiments, the system is further configured to evaluate the content of the assts in combination with an environmental identification (ID) indicating environmental factors, wherein the environmental factors include at least one of temperature, humidity, and activity at an adjacent door.

The above-described embodiments can be implemented in any of numerous ways. For example, embodiments of technology disclosed herein may be implemented using hardware, software, or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a non-transitory computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the present disclosure discussed above. The computer readable medium or media can be transportable, such that the program or programs stored thereon can be loaded onto one or more different computers or other processors to implement various aspects of the present disclosure as discussed above.

The terms "program" or "software" may be used herein to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of any preferred embodiments/aspects of the disclosure are an example and the disclosure is not limited to the exact details shown or described.

Although disclosed systems and methods are illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are contemplated hereby. Additionally, all elements, features, steps, etc., disclosed herein may be used in any combinations.

What is claimed is:

1. A method of processing transportation documentation using an electronic bill of lading comprising:
    identifying in a structure a plurality of different assets to be loaded; wherein each asset of the plurality of different assets is of a known identification and includes a RFID tag, and all RFID tags of the plurality of different assets are not the same;
    identifying a selected structural opening of a plurality of structural openings to be utilized with loading of the plurality of different assets onto a vehicle, wherein each structural opening of the plurality of structural openings is equipped with an RFID portal including a reader antenna, and each RFID portal includes at least power, sensitivity, mode and off settings;
    individually, tuning the power, sensitivity and mode settings of the RFID portal of the selected structural opening based on the known identification of the plurality of assets and RFID tags utilized in the selected structural opening such that the reader of the RFID portal of the selected structural opening reads the RFID tag of the plurality of different assets, and obtain asset details including asset serial number thereby reading and identifying the assets loaded onto the vehicle; and
    populating the electronic bill of lading and associated shipping documents with the obtained asset details of the assets loaded onto the vehicle using the RFID portal of the selected structural opening; and
    tracking the assets loaded onto the vehicle in route to a destination with use of a driver's device, wherein the populated electronic bill of lading is transferred to the driver's device.

2. The method of claim 1, wherein the structural openings are dock doors, and the method further comprises identifying inactive dock doors not receiving the assets, and individually, tuning each RFID portal of the inactive dock doors to the off setting or reduced power and sensitivity settings in order to conserve resources.

3. The method of claim 2, wherein the assets include automotive assets.

4. The method of claim 1, wherein the reader antenna is configured to transmit an interrogation signal, and each RFID tag includes a tag antenna configured to receive the interrogation signal and, in response to receiving the interrogation signal, provide an identification (ID) response representing an identity of the respective RFID tag, and further dynamically tuning the power, sensitivity and mode settings.

5. The method of claim 3, further comprising initiating a lane assignment for the selected dock door and identifying the selected dock door as active.

6. The method of claim 5, wherein the asset details further comprise at least one of asset material, asset size, quantity, tag location, tag type, tag model and tag chip type.

7. The method of claim 6, wherein a QR code is provided for the driver to scan to transfer the populated electronic bill of lading to the driver's device.

8. The method of claim 7, further comprising upon arrival at the destination transferring the populated electronic bill of lading to a shipping clerk at the destination for verification of shipment.

9. The method of claim 8, wherein the driver's device is a mobile phone or tablet.

10. The method of claim 9, wherein the populated electronic BOL further comprises associated shipping documentation all in paperless form.

11. A system for processing transportation documentation using an electronic bill of lading comprising:
   a plurality of different assets configured to be loaded; wherein each asset of the plurality of different assets is of a known identification and includes a RFID tag, and all RFID tags of the plurality of different assets are not the same;
   a plurality of RFID portals;
   wherein the system is configured to identify a selected structural opening of a plurality of structural openings to be utilized with loading of the plurality of different assets onto a vehicle, wherein each structural opening of the plurality of structural openings is equipped with an RFID portal including a reader, and each RFID portal includes at least power, sensitivity, mode and off settings;
   wherein the system is configured to individually, tune the power, sensitivity and mode settings of the RFID portal of the selected structural opening based on the known identification of the plurality of assets and RFID tags utilized in the selected structural opening such that the reader of the RFID portal of the selected structural opening reads the RFID tag of the plurality of different assets, and obtain asset details including asset serial number thereby reading and identifying the assets loaded onto the vehicle;
   wherein the system is configured to populate the electronic bill of lading with the obtained asset details of the assets loaded onto the vehicle using the RFID portal of the selected structural opening; and
   the system is further configured to track the assets loaded onto the vehicle in route to a destination with use of a driver's device, wherein the populated electronic bill of lading is transferred to the driver's device.

12. The system of claim 11, wherein the structural openings are dock doors, and the system is further configured to identify inactive dock doors not receiving the assets, and individually tune each RFID portal of the inactive dock doors to the off setting or reduced power and sensitivity settings in order to conserve resources.

13. The system of claim 12, wherein the assets include automotive assets.

14. The system of claim 11, wherein the RFID portal includes a reader antenna configured to transmit an interrogation signal, and each RFID tag includes a tag antenna configured to receive the interrogation signal and, in response to receiving the interrogation signal, provide an identification (ID) response representing an identity of the respective RFID tag, and the system is further configured to dynamically tune the power, sensitivity and mode settings.

15. The system of claim 13, wherein the system is configured to initiate a lane assignment for the selected dock door and identify the selected dock door as active.

16. The system of claim 15, wherein the asset details further comprise at least one of asset material, asset size, quantity, tag location, tag type, tag model and tag chip type.

17. The system of claim 16, wherein the system is configured to provide a QR code for the driver to scan to transfer the populated electronic bill of lading to the driver's device.

18. The system of claim 17, wherein upon the vehicle arrival at the destination, the system is configured to transfer the populated electronic bill of lading to a shipping clerk at the destination for verification of shipment.

19. The system of claim 18, wherein the driver's device is a mobile phone or tablet.

20. The system of claim 19, wherein the populated electronic BOL further comprises associated shipping documentation all in paperless form.

* * * * *